United States Patent [19]
Lagakos et al.

[11] Patent Number: 5,633,960
[45] Date of Patent: May 27, 1997

[54] SPATIALLY AVERAGING FIBER OPTIC ACCELEROMETER SENSORS

[75] Inventors: Nicholas Lagakos, Silver Spring, Md.; Joseph A. Bucaro, Herndon, Va.

[73] Assignee: The United States of America as represented by the Secretary of the Navy, Washington, D.C.

[21] Appl. No.: 719,918

[22] Filed: Sep. 25, 1996

Related U.S. Application Data

[62] Division of Ser. No. 590,651, Jan. 24, 1996.

[51] Int. Cl.⁶ ............................................. G02B 6/00
[52] U.S. Cl. ............................. 385/12; 250/227.19
[58] Field of Search .................. 385/12; 250/227.19, 250/227.12, 227.2, 227.11; 356/345

[56] References Cited

U.S. PATENT DOCUMENTS

| | | |
|---|---|---|
| 4,621,896 | 11/1986 | Lagakos et al. ............... 385/12 |
| 5,140,559 | 8/1992 | Fisher .......................... 356/345 |
| 5,367,376 | 11/1994 | Lagakos et al. ............. 385/12 X |

*Primary Examiner*—Akm E. Ullah
*Attorney, Agent, or Firm*—Thomas E. McDonnell; George Jameson

[57] ABSTRACT

An optical fiber which includes a light transmitting center portion, a protecting layer and a stress preventing layer. The protecting layer concentrically surrounds the center portion and the stress preventing layer concentrically surrounds the center portion and is positioned between the protecting layer and the center portion. The stress preventing layer has a Young's Modulus substantially lower than the Young's Modulus of the protecting layer. The optical fiber can be used in a sensor, wherein the sensor includes an encapsulant and the fiber is embedded in the encapsulant. The embedded fiber is arranged in a pancaked spiral configuration in the encapsulant. Alternatively, the embedded fiber can be arranged to form a plurality of sequential loops. The plurality of sequential loops are then arranged in the same plane as a spiral, where each of the plurality of sequential loops are perpendicular to the plane. A decoupler is also provided for attaching the sensor to a structure, to reduce stretching motion affecting the sensor.

18 Claims, 18 Drawing Sheets

SPATIALLY AVERAGING FIBER OPTIC ACCELEROMETER SENSORS

This is a division of co-pending application Ser. No. 08/590,651, filed on Jan. 24, 1996, now allowed.

BACKGROUND OF THE INVENTION

1. Field of the Invention

The present invention relates to an optical fiber having a high sensitivity to acceleration and a low sensitivity to pressure, for use in a fiber optic accelerometer sensor which detects acceleration. More specifically, the present invention relates to the various concentric layers of an optical fiber having a high sensitivity to acceleration and a low sensitivity to pressure, and to a sensor which uses the fiber.

2. Description of the Related Art

Spatially averaging accelerometer sensors detect acceleration and have many practical uses. For example, spatially averaging accelerometer sensors are used in structural acoustic applications, seismometer applications and structural mechanic applications.

There are many uses for spatially averaging accelerometer sensors in structural acoustic applications. For example, spatially averaging accelerometer sensors can be used to measure structural vibrations leading to sound scattering and radiation which is uncontaminated by higher way number noise. Thus, spatially averaging accelerometer sensors have widespread applications in active sound control to detect aircraft interior noise, underwater vehicle sound radiation/ scattering. Moreover, spatially averaging accelerometer sensors can be used in acoustic listening arrays mounted to aircraft and underwater vehicles. Spatially averaging accelerometer sensors can also be used to detect acoustic energy through acceleration, rather than through pressure. In conjunction with a large area pressure sensor, spatially averaging accelerometer sensors would provide a powerful capability for the measurement of acoustic fields near structures having general impedance properties, (e.g. the detection of the acoustic field with high signal to noise even near a soft pressure release boundary).

When used in a seismometer, a spatially averaging accelerometer sensor can be used as a sensing arm of the seismometer. The sensing arm can be on or under the ground in any desired shape and length, and the acceleration due to a seismic wave can be detected down to very low frequencies.

When used in structural mechanic applications, spatially averaging accelerometer sensors can be used to detect and monitor the vibration level of large scale objects in a noisy environment. Such objects can include large machineries, bridges, buildings, and airplane wings.

Conventional spatially averaging accelerometer sensors typically use piezo electric transducers (PZTs). Unfortunately, spatially averaging accelerometer sensors experience many problems from the use of PZTs. For example, PZTs used in spatially averaging accelerometer sensors typically have a high pressure sensitivity. This high pressure sensitivity causes problems in accurately detecting acceleration. Therefore, in order for the PZTs to accurately detect acceleration, the pressure sensitivity of the PZTs is reduced by enclosing the PZTs in undesirable, heavy metal cases.

Moreover, PZTs cannot be easily conformed to the particular shape required for specific applications, especially when acceleration must be integrated over a large area. In this case, many smaller PZTs must be connected together to form an array of sensors. Unfortunately, an array of sensors is too heavy, especially for many underwater applications where weight is important; and also it is very expensive. Further, an array of sensors is subject to electromagnetic interference since the output signal produced by the array is an electrical signal. Also, an array of sensors is limited to a relatively small size since a large array would be too fragile. Moreover, an array of sensors has an acceleration sensitivity which is undesirably limited at low frequencies.

In view of the problems encountered with using PZTs in spatially averaging accelerometer sensors, it would be desirable to create a spatially averaging accelerometer sensor which uses an optical fiber to detect acceleration, if such a spatially averaging accelerometer sensor could take advantage of the unique capabilities of fiber optic technology.

If a spatially averaging accelerometer sensor used a conventional optical fiber, most applications would require that acceleration be integrated over a defined area and detected down to low frequencies. Therefore, the optical fiber would have to be highly sensitive to acceleration, but be minimally sensitive to pressure. Unfortunately, a conventional optical fiber will not provide both a high sensitivity to acceleration and a low sensitivity to pressure. Therefore, conventional spatially averaging accelerometer sensors do not use optical fibers.

The following is an analysis of a conventional optical fiber to indicate reasons why a conventional optical fiber will not provide the required high sensitivity to acceleration and low sensitivity to pressure.

FIG. 1 is a diagram illustrating a conventional optical fiber which is commercially available. Referring now to FIG. 1, the optical fiber 30 has a center portion 32 which includes a core 33 and a glass cladding 35 which concentrically surrounds the core 33. The cladding 35 has a refractive index slightly less than the refractive index of the core 33, so that light propagates in the core 33 via total internal reflection. The center portion 32 can also includes a glass substrate 37 which concentrically surrounds the cladding 35. A first protecting layer 34 concentrically surrounds the center portion 32. The first protecting layer 34 is usually an ultraviolet (U.V.) curable polymer layer, similar to silicone. A second protecting layer 36 concentrically surrounds the center portion 32 and the first protecting layer 34. The second protecting layer 36 is a hard plastic layer, such as Hytrel (trademark), and is directly adjacent to the first protecting layer 34 with no other layers therebetween. As illustrated in FIG. 1, the center portion 32 has an outside diameter (OD) of about 125 μm, and the first protecting layer 34 has an outside diameter of about 250 μm. Fiber 30 is a typical single-mode conventional fiber.

FIG. 2 is a diagram illustrating a conventional fiber interferometer 38 which can be used to measure the sensitivity of a fiber by measuring the change of the phase of light transmitted through the fiber. Referring now to FIG. 2, the fiber interferometer 38 has a reference arm 40 and a sensing arm 42. The reference arm 40 and the sensing arm 42 are optical fibers. A light source 44 transmits light into an input lead 46. A first coupler 48 couples the input lead 46 to the reference arm 40 and the sensing arm 42, so that light transmitted from the light source 44 is divided and passes through the reference arm 40 and the sensing arm 42. A second coupler 50 couples the reference arm 40 and the sensing arm 42 to an output lead 52, so that light transmitted through the reference arm 40 and the sensing arm 42 is coupled together to the output lead 52. The input lead 46 and the output lead 52 are optical fibers. A detector 54 is connected to the output lead 52. The detector 54 detects changes in the phase of light transmitted from the light source 44, through the reference arm 40 and the sensing arm 42, and then coupled to the output lead 52. The sensitivity of the sensing arm 42 to any field (such as pressure) can then be determined in a conventional manner from the detected phases.

Pressure Sensitivity of Free Fibers

A free fiber is a fiber which is not embedded or encased in an encapsulant. Using the fiber interferometer 38 illustrated in FIG. 2, the pressure sensitivity of the optical phase in a free fiber, such as fiber 30, can be detected. The pressure sensitivity is defined as $$\frac{\Delta\phi}{\phi\Delta P}$$

where $\Delta\Phi$ is the shift in the phase $\Phi$ due to a pressure change $\Delta P$. If the given pressure change $\Delta\Phi$ results in a fiber core axial strain $e_z$ and radial strain $e_r$, then the following Equation 1 applies:

Equation 1:

$$\frac{\Delta\phi}{\phi} = e_z - \frac{n^2}{2}[(P_{11}+P_{12})e_r + P_{12}e_z],$$

where $P_{11}$ and $P_{12}$ are the elastooptic coefficients of the core and n is the refractive index of the core. Hereinafter, $e_z^1$ refers to the first term in Equation 1, above. $e_r^P$ and $e_z^P$ refer to the last two terms, respectively, in Equation 1.

FIG. 3 is a diagram illustrating the effects of $e_z^1$, $e_r^P$ and $e_z^P$ on an optical fiber 30. As illustrated in FIG. 3, $e_z^1$ results in end pressure which shortens the fiber 30, $e_r^P$ results in lateral pressure which reduces the diameter of the fiber 30, and $e_z^P$ results in lateral pressure which elongates the fiber 30.

FIG. 4 is a graph illustrating the pressure sensitivity of a free fiber 30 (see FIG. 1) as a function of the thickness of the second protecting layer 36, where the second protecting layer 36 is made of the hard plastic material Hytrel (trademark). The thickness of the second protecting layer 36 usually varies in different fibers.

As illustrated in FIG. 4, the largest magnitude contribution is from the term $e_z^1$, which is the part of $$\frac{\Delta\phi}{\phi\Delta P}$$

due to the fiber length change. The $e_r^P$ and $e_z^P$ terms are due to the photoelastic effect, and they are opposite in polarity to each other and produce smaller contributions to the magnitude of pressure sensitivity than the term $e_z^1$. As the thickness of the second protecting layer 36 increases (see FIG. 4), the magnitude of the pressure sensitivity increases rapidly. This rapid increase in magnitude is primarily due to the change in the contribution from the term $e_z^1$. This pressure sensitivity illustrated in FIG. 4 for a conventional free fiber is too high for use in a spatially averaging accelerometer sensor.

In general, the pressure sensitivity is a very strong function of the elastic moduli of the material (for example, the hard plastic material Hytrel (trademark)) forming the second protecting layer 36 of the fiber 30. For a typical fiber 30, high pressure sensitivity requires a second protecting layer 36 having a low Bulk Modulus and a high Young's Modulus. In this case, the Bulk Modulus determines the "maximum" fiber dimensional changes, while the Young's Modulus governs the fraction of these changes, or strains, which can couple to the center portion 32 (including the core 33) of the fiber.

Pressure Sensitivity of Embedded Fibers

FIG. 5 is a diagram of a planar sensor 58 which uses the conventional fiber 30 illustrated in FIG. 1. FIG. 6 is a cross-section along lines VI—VI in FIG. 5, although not drawn to scale. For example, FIG. 6 shows less optical fiber cross-sections of fiber 30 then would actually be present from a more accurate cross-section of sensor 58. To be used in a spatially averaging accelerometer sensor, the sensor 58 should be capable of functioning as a sensing arm of the accelerometer to detect acceleration. As can be seen from FIGS. 5 and 6, the sensor 58 is formed by a spirally arranged fiber 30, where the spiral is arranged in a single plane. This fiber configuration can be referred to as a "pancaked spiral" configuration. The spirally arranged fiber 30 is embedded in a polyurethane layer 60 (for example, Polyurethane, Uralite 3140 (Trademark)), where polyurethane is a known elastomeric material. To analyze the sensor 58, the polyurethane layer 60 is approximated as a concentric circular coating over the fiber 30, as illustrated in FIG. 7. The approximation illustrated in FIG. 7 is equivalent to assuming that the sensor 58 was formed by spiraling fiber that had first been coated with a concentrically surrounding layer of polyurethane.

FIG. 8 is a graph illustrating the pressure sensitivity of the fiber 30 illustrated in FIG. 7, versus the fiber radius, considering each of the fiber layers. As illustrated in FIG. 8, and similar to the case of a free fiber illustrated in FIG. 4, the largest contribution to the pressure sensitivity of an embedded fiber 30 results from the term $e_z^1$, which is due to the fiber length change (that is, the first term in Equation 1). However, as illustrated in FIG. 8, as the thickness of the polyurethane layer 60 of an embedded fiber 30 increases, the magnitude of the pressure sensitivity rapidly increases. This rapid increase is primarily due to change resulting from the term $e_z^1$.

Therefore, as can be seen from FIGS. 4 and 8, the pressure sensitivity of an embedded fiber (FIG. 8) is significantly higher than that of a free fiber (FIG. 4) due to the compliant encapsulant (that is, the polyurethane layer 60 of embedded fiber 30 in FIGS. 5, 6 and 7) which is relatively thick and has low Bulk Modulus. Thus, an embedded fiber would not provide the low pressure sensitivity required for use in a spatially averaging accelerometer sensor.

Pressure Insensitive Fibers

Thus, the pressure sensitivity of an optical fiber is related to the combined effects of pressure induced fiber length changes (resulting from the term $e_z^1$ in Equation 1) and strain induced index of refraction effect such as the photoelastic effect (resulting from the terms $e_r^P$ and $e_z^P$ in Equation 1). These effects are generally of opposite polarity, as illustrated in FIG. 4. Accordingly, pressure insensitivity can be achieved by balancing these effects.

More specifically, as disclosed in U.S. Pat. No. 4,427,263, it is possible to achieve such balancing by designing fibers consisting of a glass core with a relatively low Bulk Modulus, and a glass substrate surrounding the glass core, wherein the glass substrate has a high Bulk Modulus. The glass core and glass substrate can then be coated with a soft rubber coating, and then with a hard plastic.

Moreover, as disclosed in U.S. Pat. No. 4,427,263, pressure insensitive fibers can be produced by applying a high Bulk Modulus glass substrate or metal coating to conventional fibers. For example, a typical high silica fiber can be made pressure insensitive by coating the fiber with a high Bulk Modulus metal, such as aluminum or nickel.

FIG. 9 is a graph illustrating the calculated sensitivity $$\frac{\Delta\phi}{\phi\Delta P}$$

of a conventional pressure insensitive fiber as a function of the metal coating thickness of the fiber. More specifically, FIG. 9 illustrates the calculated sensitivity for a fiber coated with nickel and then with a Hytrel (trademark) plastic coating of a 100-µm o.d. As illustrated in FIG. 9, the magnitude of the fiber pressure sensitivity decreases rapidly as the nickel thickness increases and, at approximately 15.5-µm nickel thickness, the fiber becomes pressure insensitive. Therefore, the 15.5-µm nickel thickness of the nickel can be referred to as the "critical thickness." An increase in the Hytrel (trademark) plastic coating thickness results in a further, fairly rapid change in the fiber pressure sensitivity. In this case, the thickness of the nickel must be close to the critical thickness if substantially desensitized fibers are desired.

Generally, fibers are not free, but are mounted on a substrate or are embedded in an encapsulant (as illustrated, for example, in FIGS. 5, 6 and 7). For a fiber embedded in an encapsulant, the pressure sensitivity of the fiber is controlled by the elastic moduli of the encapsulant (such as the polyurethane layer 60 illustrated in FIGS. 5, 6 and 7) surrounding the fiber. Therefore, as illustrated in FIG. 8, a compliant elastomer (such as polyurethane) used as an encapsulant will significantly, and undesireably, increase the fiber pressure sensitivity. This increase in fiber pressure sensitivity is due to the low Bulk Modulus of the compliant elastomer and results primarily from the term $e_z^1$ corresponding to the direct fiber length change.

Moreover, a conventional pressure insensitive fiber (whether as a free fiber or as an embedded fiber) has relatively good bonding across all layer interfaces. This relatively good bonding has the undesirable effect of efficiently communicating strain to the core of the fiber from surrounding layers. As a result, strain generated in the encapsulant by an applied pressure propagates to the outer coating of the fiber, then to the inner coating, and finally, to the core. This strain causes undesirable phase modulation in light transmitted through the fiber.

Therefore, a conventional pressure insensitive fiber will not be effective when used in a spatially averaging accelerometer sensor due to the pressure sensitivity of the fiber when embedded in an encapsulant.

SUMMARY OF THE INVENTION

Accordingly, it is an object of the present invention to provide an optical fiber having high acceleration sensitivity and reduced pressure sensitivity.

It is an additional object of the present invention to reduce the pressure sensitivity in an optical fiber by preventing the strain (in particular, the $e_z^1$ term of Equation 1) generated in surrounding layers from being communicated to the core of the fiber.

It is a further object of the present invention to provide a spatially averaging accelerometer sensor which uses fiber optics, and has a high acceleration sensitivity and a low pressure sensitivity.

Additional objects and advantages of the invention will be set forth in part in the description which follows, and, in part, will be obvious from the description, or may be learned by practice of the invention.

The foregoing objects of the present invention are achieved by providing an optical fiber which includes a light transmitting core, a protecting layer and a stress preventing layer. The protecting layer concentrically surrounds the core, and reduces the effect of environmental factors on the core. The stress preventing layer concentrically surrounds the core and is positioned between the protecting layer and the core. The stress preventing layer has a Young's Modulus substantially lower than the Young's Modulus of the protecting layer, for preventing stress from being transferred from the protecting layer to the core.

Objects of the present invention are also achieved by providing a sensor which includes an encapsulant and a fiber embedded in the encapsulant. The fiber includes a light transmitting core, a protecting layer and a stress preventing layer. The protecting layer concentrically surrounds the core, and reduces the effect of environmental factors on the core. The stress preventing layer concentrically surrounds the core and is positioned between the protecting layer and the core. The stress preventing layer has a Young's Modulus substantially lower than the Young's Modulus of the protecting layer, for preventing stress from being transferred from the protecting layer to the core. The embedded fiber is arranged in a pancaked spiral configuration in the encapsulant. Alternatively, the embedded fiber can be arranged to form a plurality of sequential loops. The plurality of sequential loops are then arranged in the same plane as a spiral, where each of the plurality of sequential loops are perpendicular to the plane. In an additional embodiment, the embedded fiber is arranged as at least one cylindrical-shaped coil in the encapsulant.

Further, objects of the present invention are achieved by providing a decoupler, or more than one decoupler, for attaching a fiber optic sensor to a structure. The decoupler includes a first layer and a second layer. The first layer is made of a material having a Young's Modulus less than or equal to $1 \times 10^{10}$ dyn/cm$^2$. The first layer has a first side and a second side, with the first side being adjacent to the structure. The second layer is made of a material having a Young's Modulus greater than $1 \times 10^{10}$ dyn/cm$^2$. The second layer has a first side and a second side, with the first side being adjacent to the second side of the first layer, and the second side being connected to the fiber optic sensor, thereby attaching the fiber optic sensor to the structure.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
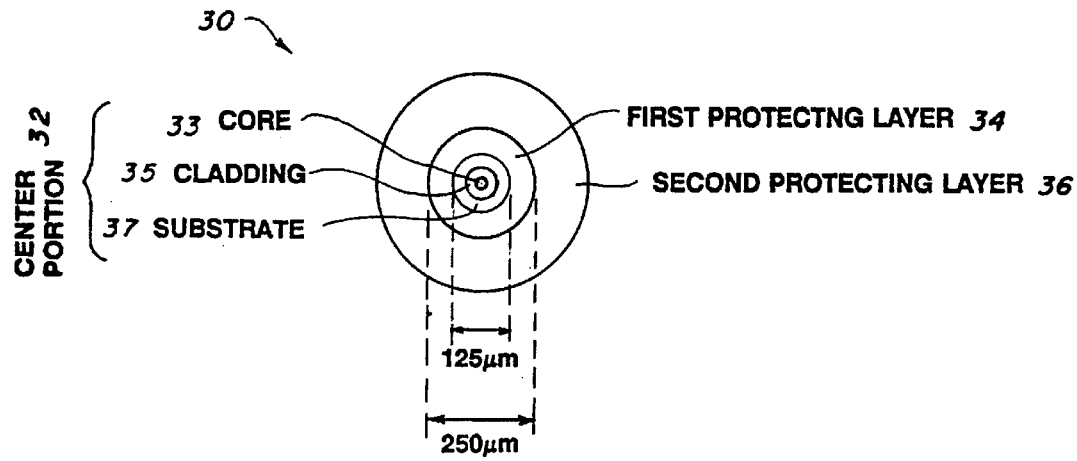
FIG. 1 (prior art) is a diagram illustrating a conventional optical fiber.

Reference will now be made in detail to the present preferred embodiments of the present invention, examples of which are illustrated in the accompanying drawings, wherein like reference numerals refer to like elements throughout.

Figure 10:
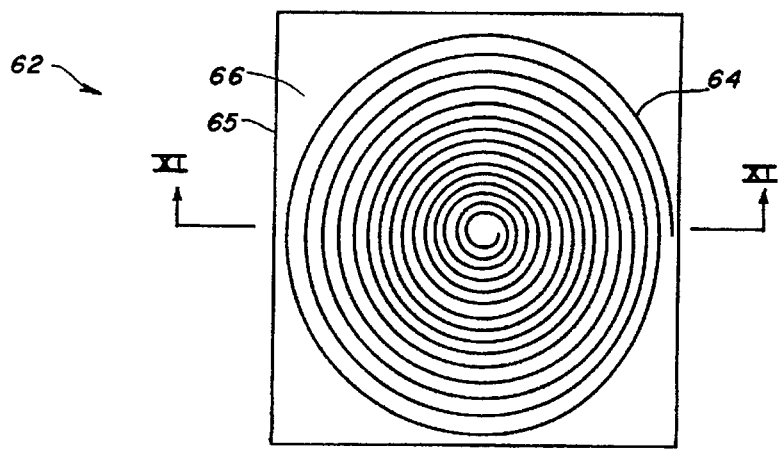
FIG. 10 is a diagram illustrating a planar sensor which uses an optical fiber, according to an embodiment of the present invention.

FIG. 10 is a diagram illustrating a planar sensor 62 which uses an optical fiber 64, according to an embodiment of the present invention. As illustrated in FIG. 10, the sensor 62 has a large face 65 and the fiber 64 arranged therein as a spiral or "coil." The large face 65 is a plane formed by an elastomeric layer 66 in which the fiber 64 is embedded. The elastomeric layer 66 is preferably made of polyurethane. However, the elastomeric layer 66 is not limited to being polyurethane, and can be any elastomeric material.

Figure 11:
FIG. 11 is a diagram illustrating a cross-section along lines XI—XI in FIG. 10, showing a plurality of fiber cross-sections, according to an embodiment of the present invention.

FIG. 11 illustrates a cross-section along lines XI—XI of the sensor 62 illustrated in FIG. 10, although not drawn to scale, according to an embodiment of the present invention. For example, FIG. 11 shows less optical fiber cross-sections of fiber 64 than would actually be present from a more accurate cross-section of sensor 62. As can be seen from FIGS. 10 and 11, the sensor 62 includes the fiber 64 formed in a spiral and arranged in a single plane. This fiber configuration can be referred to as a "pancaked spiral" configuration. Therefore, FIG. 11 illustrates a plurality of fiber cross-sections of fiber 64.

Figure 12:
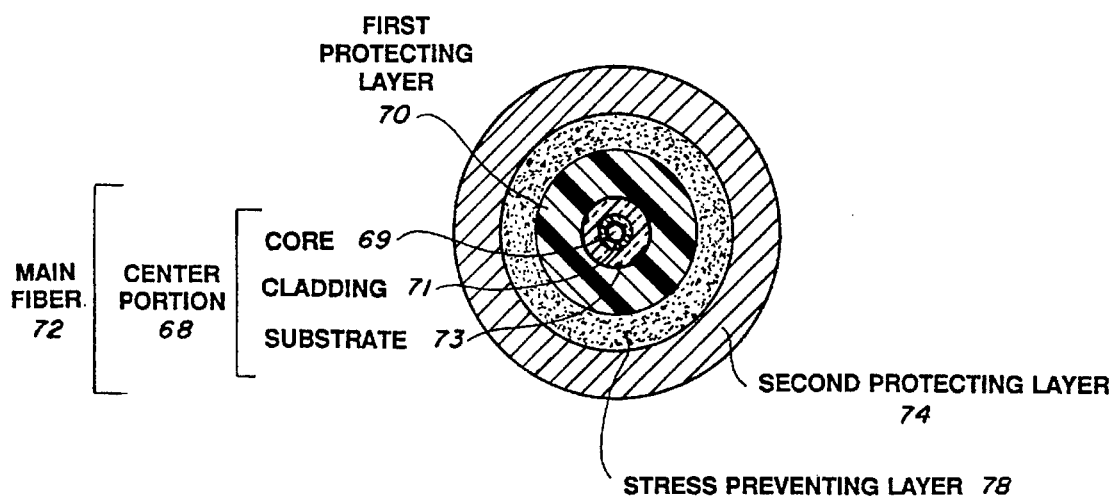
FIG. 12 is a diagram illustrating a single fiber cross-section of the plurality of cross-sections illustrated in FIG. 11, according to an embodiment of the present Invention.

FIG. 12 illustrates a single fiber cross-section of the fiber 64, according to an embodiment of the present invention. Therefore, the fiber 64 as illustrated in FIG. 12 can be arranged in almost any shape and length. Further, according to embodiments of the present invention, the fiber 64 is arranged in a spiral and embedded in the elastomeric layer 66, as in FIGS. 10 and 11, for use as a sensor in an accelerometer.

Referring now to FIG. 12, the fiber 64 comprises a center portion 68 which includes a light transmitting core 69, a cladding 71 which concentrically surrounds the core 69, and a substrate 73 which concentrically surrounds the cladding 71. As illustrated in FIG. 12, the center portion 68 is preferably of a 125 μm o.d. Preferably, the core 69, the cladding 71 and the substrate 73 are each made of glass. The cladding 71 has a refractive index slightly less than the refractive index of the core 69, so that light propagates in the core 69 via total internal reflection. It is preferable to use a center portion which includes a core, a cladding and a substrate, as in FIG. 12; however, a center portion can include only a core, without having a surrounding cladding and a surrounding substrate. Similarly, a center portion could also include a core and a surrounding cladding, without having a surrounding substrate.

A first protecting layer 70 concentrically surrounds the center portion 68 to protect the strength of the center portion 68, including the core 69. The first protecting layer 70 is preferably a 250 μm o.d. U.V. coating which is immediately applied over the center portion 68 at the time of manufacture of the fiber. A single mode fiber with a 250 μm o.d. U.V. coating (as a first protecting layer 70) over a 125 μm o.d. glass (as a center portion 68) is known and commercially available. The combination of the center portion 68 and first protecting layer 70 will hereafter also be referred to as the "main fiber" 72.

The main fiber 72 is then coated with a second protective layer 74 which concentrically surrounds the center portion 68. Preferably, the second protective layer 74 is a hard tubing, such as a stainless steel tubing with a 840 μm o.d. and a 640 μm I.d. A stress preventing layer 78 concentrically surrounds the center portion 68 and is positioned in a space between the second protective layer 74 and the center portion 68. In addition, the stress preventing layer 78 is between the first protecting layer 70 and the second protecting layer 74. The stress preventing layer 78 is preferably filled in between the first protecting layer 70 and the second protecting layer 74 when the main fiber 72 is being coated with the second protecting layer 74. Preferably, the stress preventing layer 78 is a viscous material, such as a gel. More preferable, the stress preventing layer 78 is a gel which is fluid and fairly viscous, but is stable in the confined space between the first protecting layer 70 and the second protecting layer 74.

As will be seen below, the fiber 64 illustrated in FIG. 12 reduces the fiber pressure sensitivity and the pressure induced strain communicated to the center portion 68 (and especially to the core 69) of the fiber 64, according to an embodiment of the present invention. More specifically, the fiber 64 reduces the effect of the $e_z^1$ term (see Equation 1) so that strain due to pressure is not communicated to the core 69 of the fiber 64. Further, the fiber 64 has high acceleration sensitivity down to low frequencies.

Moreover, the fiber 64 has very low pressure sensitivity which, potentially, can be zero. The second protecting layer 74 (for example, a stainless steel tubing) has a very high Young's Modulus and, as a result, the second protecting layer 74 minimizes any pressure induced strains generated in the first protecting layer 70 and the core 69. These small strains would otherwise be undesireably communicated to the core 69. Thus, the combination of the very hard metal of the second protecting layer 74 and the very soft gel of the stress preventing layer 78 together function to minimize pressure induced strain applied on the core 69.

Generally, the second protecting layer 74 greatly reduces the pressure sensitivity of the fiber 64. However, there will still be a very small strain which may be transferred to the core 69. Therefore, the stress preventing layer 78 is made of a material (preferably a gel) which deforms In response to very small stress which is not eliminated by the second protecting layer 74. The deformation functions to absorb the small stress, without affecting the core 69. Therefore, the combination of the second protecting layer 74 and the stress preventing layer 78 together function to dramatically reduce pressure sensitivity of the core 69, while still allowing the core 69 to have a high acceleration sensitivity.

The various layers of the fiber 64 can be defined in terms of the Young's Modulus or the Bulk Modulus of the material of the layer. The core 69 is preferably made of glass. A preferable glass core would have a Bulk Modulus of approximately $35 \times 10^{10}$ dyn/cm$^2$. However, the core 69 can be made of a different type of material, such as plastic (e.g. acrylic). The main function of the core 69 is to act as a layer for propagating light, and can be made of any suitable material which accomplishes this function. The cladding 71 can then Me selected to provide optimum light propagation through the core 69.

The first protecting layer 70 functions to protect the core 69 from environmental factors, such as damage causes by external chemicals, damage caused by mechanical movement, and microbending losses. The first protecting layer 70 is preferably made of a U.V. curable material. However, the first protecting layer 70 can be made of a material which is not U.V. curable, as long as the first protecting layer 70 functions to protect the core 69 from the environment. For example, the first protecting layer 70 can be made of silicone or amorphous carbon. The first protecting layer 70 preferably has a Young's Modulus of approximately $0.6 \times 10^{10}$ dyn/cm$^2$.

The second protecting layer 74 should be a hard material and function to protect all inside layers from environmental affects. Preferably, the second protecting layer 74 is a made of a stiff material, such as stainless steel. However, the second protecting layer 74 can be made of other materials, such as hard plastic or aluminum. The second protecting layer 74 should have a Young's Modulus of greater than or equal to $5 \times 10^{10}$ dyn/cm$^2$. Preferably, the second protecting layer 74 has a Young's Modulus of greater than or equal to $35 \times 10^{10}$ dyn/cm$^2$. More preferable, the second protecting layer 74 has a Young's Modulus of greater than or equal to $70 \times 10^{10}$ dyn/cm$^2$, which is approximately the Young's Modulus of a glass core. Even more preferable, the second protecting layer 74 has a Young's Modulus of greater than or equal to $70 \times 10^{10}$ dyn/cm$^2$, to produce even better results. Alternatively, the second protecting layer 74 should be selected to have a Young's Modulus higher than the Young's Modulus of the core 69. Generally, the second protecting layer 74 should be as hard as possible for a fiber coating.

The stress preventing layer 78 should be a relatively soft or fluid material and function to prevent stress from being transferred from the second protecting layer 74 to the core 69. Preferably, the stress preventing layer 78 is a gel. However, the stress preventing layer 78 can be a different material, and can even be air or a liquid. The stress preventing layer 78 should have a Young's Modulus of less than or equal to $5 \times 10^{10}$ dyn/cm$^2$. Preferably, the stress preventing layer 78 has a Young's Modulus of less than or equal to $0.004 \times 10^{10}$ dyn/cm$^2$. Even more preferably, the stress preventing layer 78 has a Young's Modulus of less than or equal to $0.0035 \times 10^{10}$ dyn/cm$^2$, which is approximately the Young's Modulus of silicone.

Pressure Sensitivity Experiments

Experiments were performed to measure the pressure sensitivity of the fiber 64.

Figure 2:
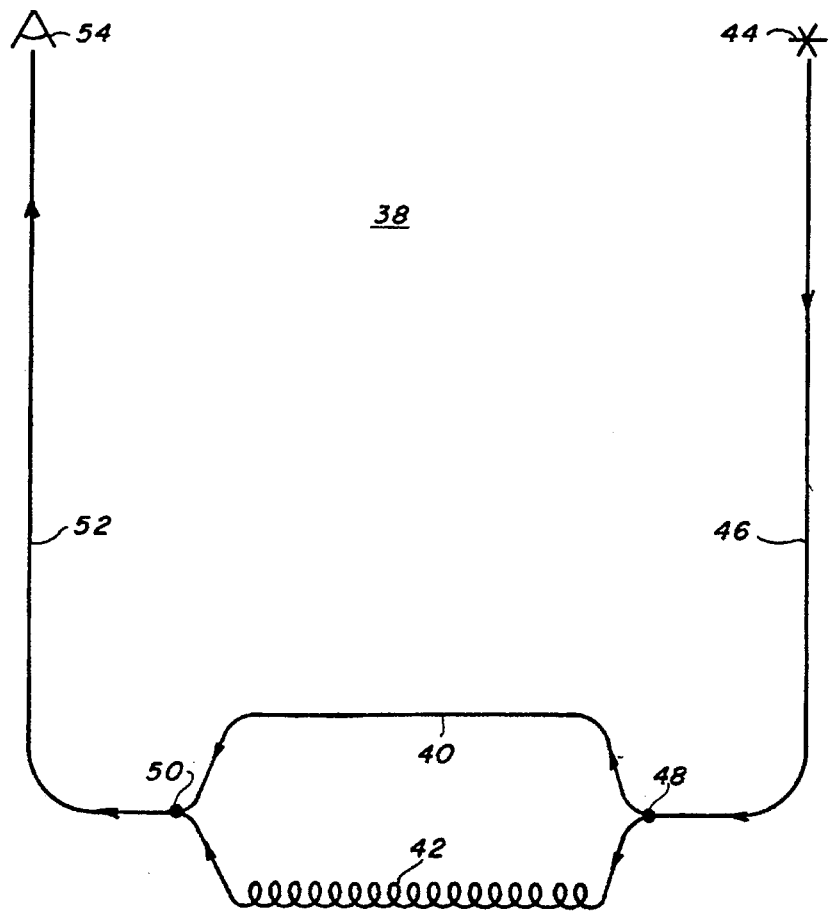
FIG. 2 (prior art) is a diagram illustrating a conventional Mach-Zehnder optical fiber interferometer which can be used to measure the pressure sensitivity of the optical phase of light transmitted through an optical fiber.
Figure 3:
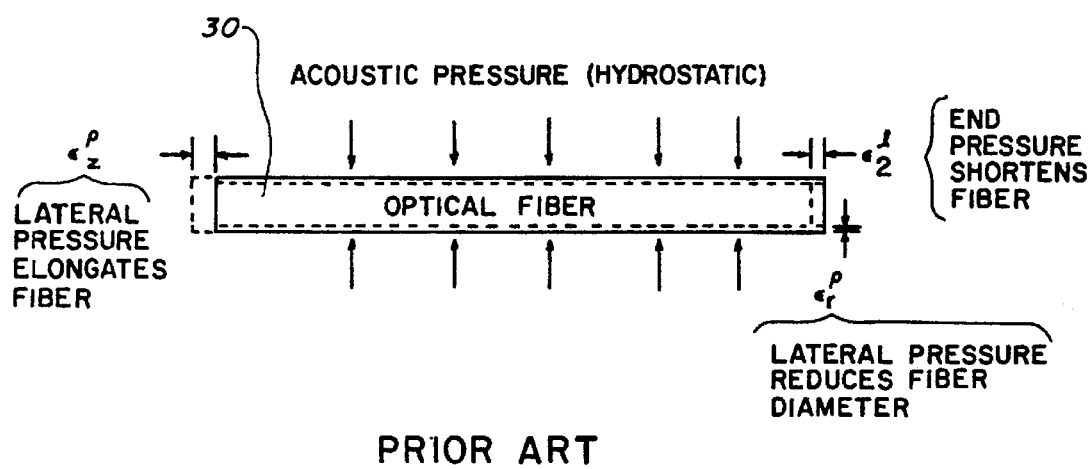
FIG. 3 (prior art) is a diagram showing various strains on an optical fiber.
Figure 4:
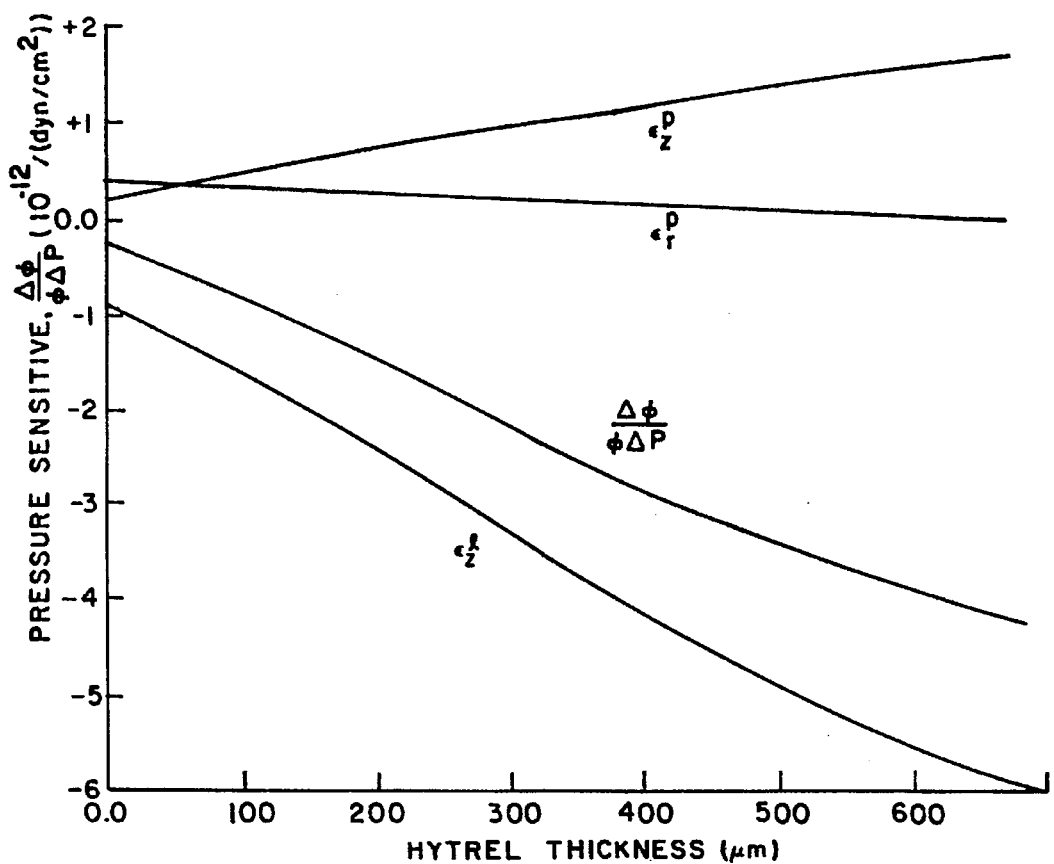
FIG. 4 (prior art) is a graph illustrating the pressure sensitivity of a typical single-mode fiber as a function of the thickness of a surrounding hard plastic layer.
Figure 5:
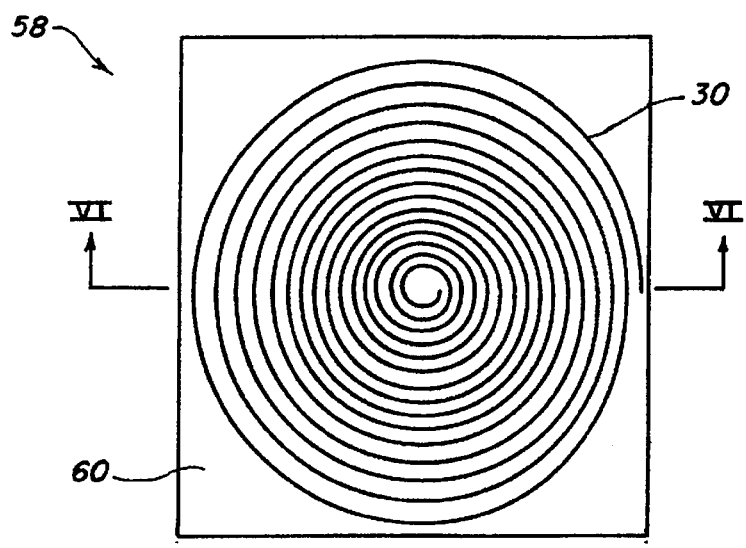
FIG. 5 (prior art) is a diagram illustrating a planar sensor which uses the optical fiber illustrated in FIG. 1.
Figure 13:
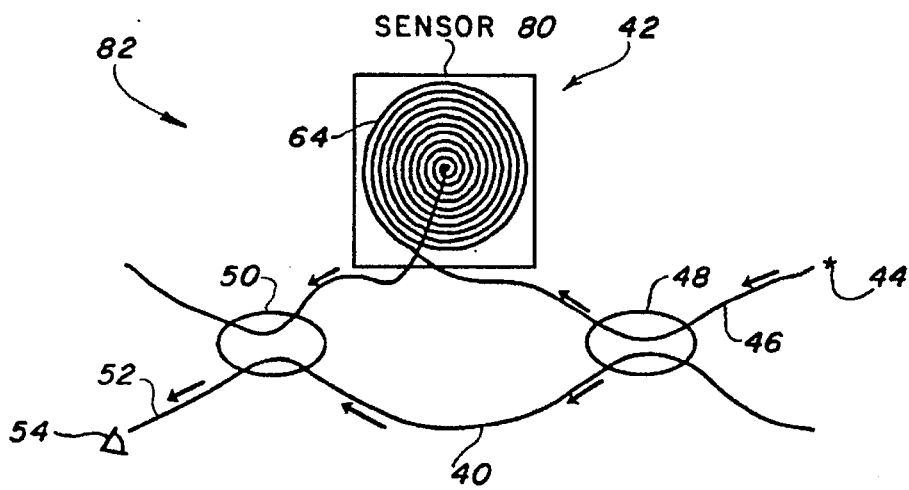
FIG. 13 is a diagram illustrating a fiber formed as a sensor in a Mach-Zehnder interferometer, according to an embodiment of the present invention.

FIG. 13 illustrates the fiber 64 formed as a sensor 80 which is part of a Mach-Zehnder interferometer 82. The Mach-Zehnder interferometer 82 Illustrated in FIG. 13 is similar to the interferometer 38 illustrated in FIG. 2. More specifically, the Mach-Zehnder Interferometer 82 has a light source 44, a detector 54, a reference arm 40, a sensing arm 42, an input lead 46, an output lead 52, a first coupler 48 and a second coupler 50 which function as previously described for FIG. 2.

As illustrated in FIG. 13, the fiber 64 was wrapped in a spiral, or planar coil, as shown in FIGS. 10 and 11, to form a sensor 80 having a "pancaked spiral" configuration. The sensor 80 was used as the sensing arm 42 of the Mach-Zehnder Interferometer 82.

Figure 14:
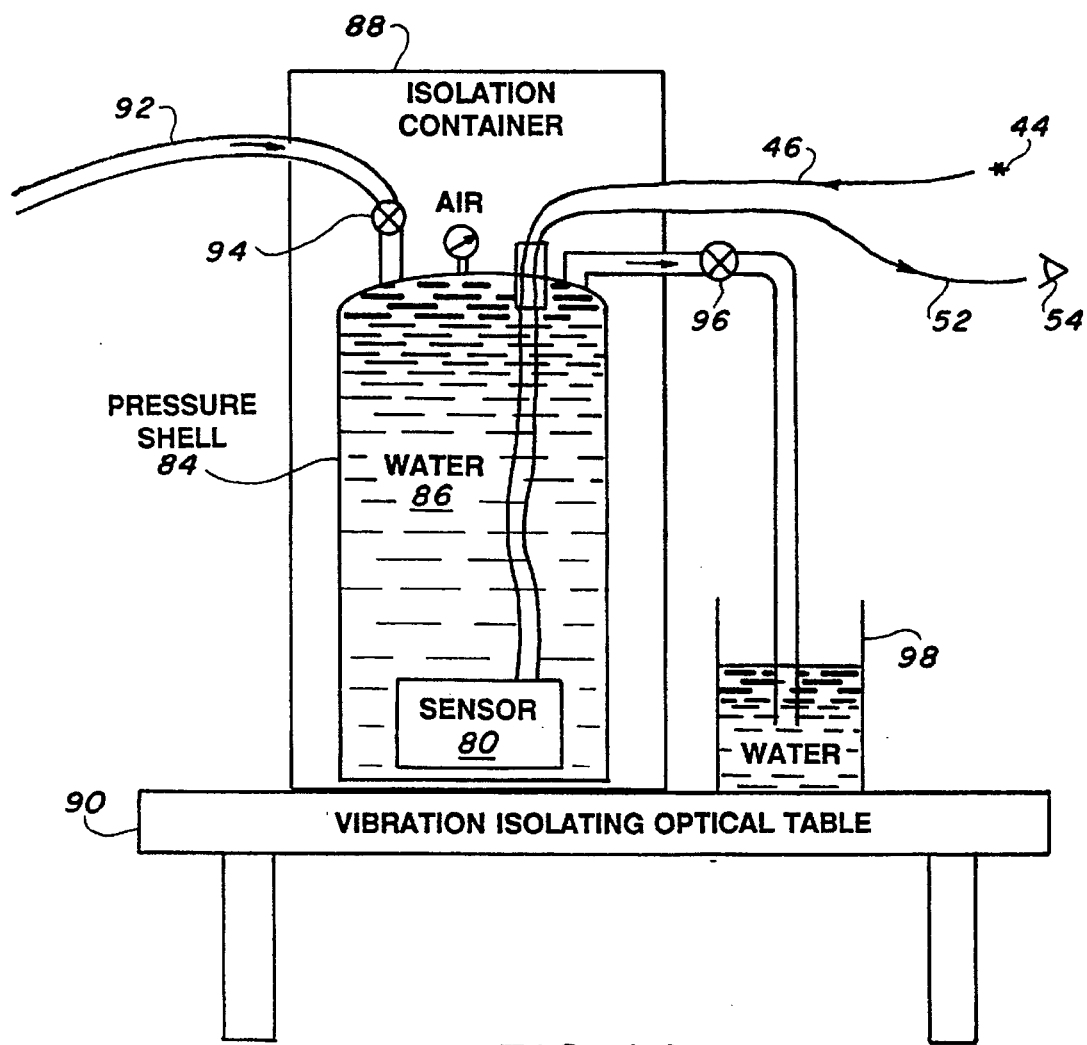
FIG. 14 is a diagram illustrating an experimental setup used to verify the pressure sensitivity of various sensors, according to an embodiment of the present invention.

FIG. 14 illustrates an experimental setup which used the Mach-Zehnder interferometer 82 and the sensor 80 of FIG. 13 to verify the low pressure sensitivity of the fiber. The experimental setup was designed to simulate pressure on the sensor 80.

As illustrated in FIG. 14, the sensor 80 was placed in a pressure shell 84 filled with water 86. The pressure shell 84 was placed inside an Isolating container 88, made of plexiglass, to minimize environmental effects such as air currents. The experiment was performed on a vibration Isolating optical table 90 having measurements of 4'×8'×8". Pressure (up to 35 psi, and read by an Ascraft (trademark) meter) was applied to the pressure shell by a supply tube 92 from the water supply of the laboratory. A first valve 94 and a second valve 96 were used to increase or decrease the pressure of the pressure shell 84. Excess water was drained into a separate container 98 outside the isolation container 88. A single mode, solid state pumped, Nd Yag (Lightwave Electronics, Model 123 (trademark)) laser 44, and two fiber couplers (Aster Inc. (trademark)) (not illustrated) were used as the first and second couplers 48 and 50.

In the experiments, the main fiber 72 (see FIG. 12) was an AT&T dispersion shifted, single mode (at 1.3 μm) fiber comprising a center portion 68 made of a 125 μm o.d. glass. Thus, the center portion 68 had a glass core 69. A first protecting layer 70 was made of a 250 μm o.d. U.V. coating. The output of the detector 54 was fed to, and stored in, a LeCroy 9400 (trademark) digital oscilloscope (not illustrated). Experiments were then performed on various types of fibers and sensors, as described below.

250 μm Single Mode Fiber

Figure 6:
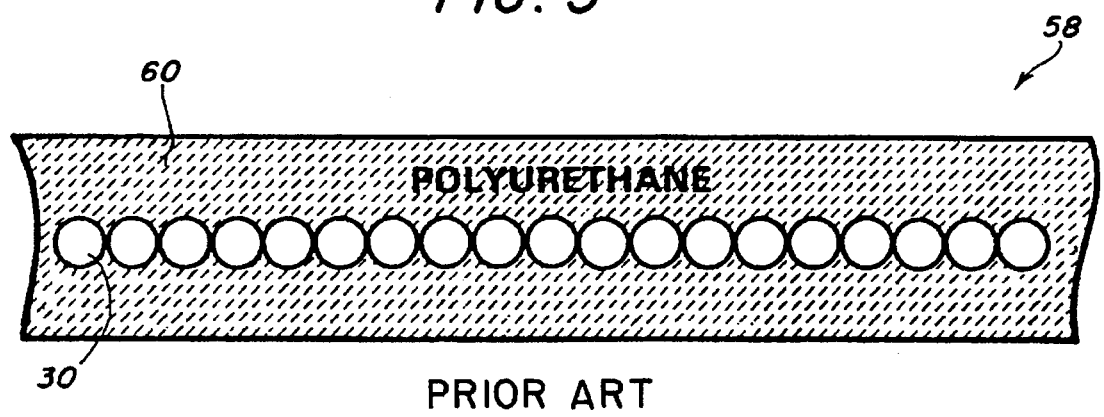
FIG. 6 (prior art) is diagram illustrating a cross-section along lines VI—VI of the sensor illustrated in FIG. 5.

In this experiment, the main fiber 72 was tested, without having a surrounding stress preventing layer 78 and a surrounding second protecting layer 74. The main fiber 72 (comprising a center portion 68 made of a 125 μm o.d. glass and a first protecting layer 70 made of a 250 μm o.d. U.V. coating) was 34 m long and formed a planar coil or "pancaked spiral" similar to the arrangement shown in FIGS. 10 and 11, but was not embedded in any encapsulant (that is, the spiral was not embedded in a polyurethane layer, such as the polyurethane layer 60 illustrated in FIG. 6). The change of the phase ΔΦ per change in pressure Δp was found via the following Equations 2 and 3.

Equation 2:

Experiment:

$$\frac{\Delta\phi}{\phi\Delta p} = 5.3 \times 10^{-13}/(\text{dyn/cm}^2) = -345 \text{ dB } re \text{ 1/μPa}$$

Equation 3:

Analysis:

$$\frac{\Delta\phi}{\phi\Delta p} = 5.17 \times 10^{-13}/(\text{dyn/cm}^2) = -346 \text{ dB } re \text{ 1/μPa}$$

The analytically calculated sensitivity was obtained using Equation 1. From Equations 2 and 3, it can see that there is agreement between experimental results and analytical results.

Fiber in Stainless Steel Tubing

In this experiment, a fiber 64 as illustrated in FIG. 12 was tested. The main fiber 72 (comprising a center portion 68 made of a 125 μm o.d. glass and a first protecting layer 70 made of a 250 μm o.d. U.V. coating) was inside a second protecting layer 74. The second protecting layer 74 was stainless steel tubing. A stress preventing layer 78 was a gel that was filled in between the first protecting layer 70 and the second protecting layer 74. The fiber 64 was 18 m long and was formed in a coil or "pancaked spiral" similar to the arrangement shown in FIGS. 10 and 11, but was not embedded in any encapsulant, that is, the spiral was not embedded in a polyurethane layer, such as the polyurethane layer 60 illustrated in FIG. 6. The pressure sensitivity was found by the following Equation 4.

Equation 4:

Experiment:

$$\frac{\Delta\phi}{\phi\Delta p} = 0.233 \times 10^{-12}/(\text{dyn/cm}^2) = -353 \text{ dB } re \text{ 1/μPa}$$

This is a very low pressure sensitivity. As a comparison, the sensitivity of the main fiber 72 (comprising a center portion 68 made of a 125 μm o.d. glass and a first protecting layer 70 made of a 250 μm o.d. U.V. coating) was calculated from the following Equation 5.

Equation 5:

Analysis:

$$\frac{\Delta\phi}{\phi\Delta p} = 0.56 \times 10^{-12}/(\text{dyn/cm}^2) = -345 \text{ dB } re \text{ 1/μPa}$$

(250 μm fiber)

In addition, the sensitivity of only the center portion 68 (made of a 125 μm o.d. glass) was calculated from the following Equation 6.

Equation 6:

Analysis:

$$\frac{\Delta\phi}{\phi\Delta p} = 0.36 \times 10^{-12}/(\text{dyn/cm}^2) = -349 \text{ dB } re \text{ 1/μPa}$$

(125 μm glass)

From Equations 4, 5, and 6, it can be seen that the pressure sensitivity of a fiber having stainless steel tubing as the second protecting layer 74 and a gel as the stress preventing layer 78 is lower than that of the main fiber 72 (see Equation 5) and closer to that of the bare glass (see Equation 6).

Fiber in Stainless Steel Tubing with Gel Embedded in Polyurethane

In this experiment, a fiber 64 with the very low pressure sensitivity formed a coil (20 m long) and was embedded in a 6"×6"×1" elastomeric layer 66 made of polyurethane, as shown in FIGS. 10 and 11. The polyurethane layer was made of Uralite 3140 (trademark) material. The pressure sensitivity was found from the following Equation 7.

Equation 7:

Experiment:

$$\frac{\Delta\phi}{\phi\Delta p} = 0.12 \times 10^{-12}/(\text{dyn/cm}^2) = -359 \text{ dB } re \text{ 1/μPa}$$

This is a very low pressure sensitivity. A sensor 62 as in FIGS. 10 and 11 with such a very low pressure sensitivity provides a solid basis for use as an accelerometer.

Figure 7:
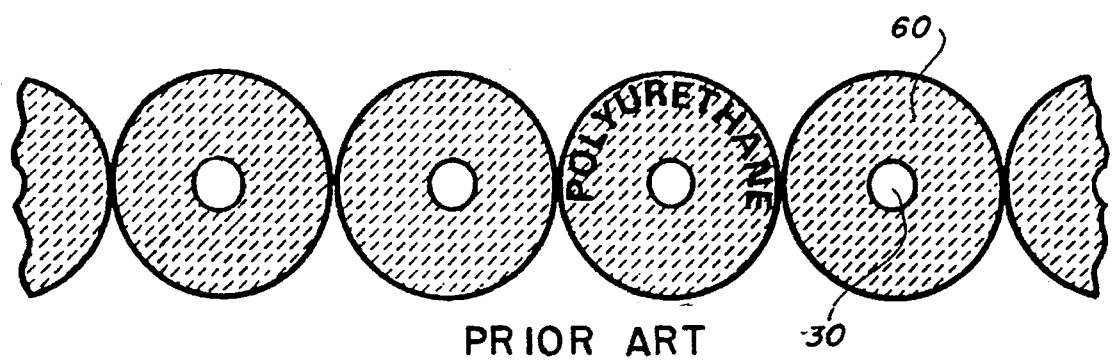
FIG. 7 (prior art) is a diagram illustrating an approximation of the cross-section illustrated in FIG. 6.
Figure 8:
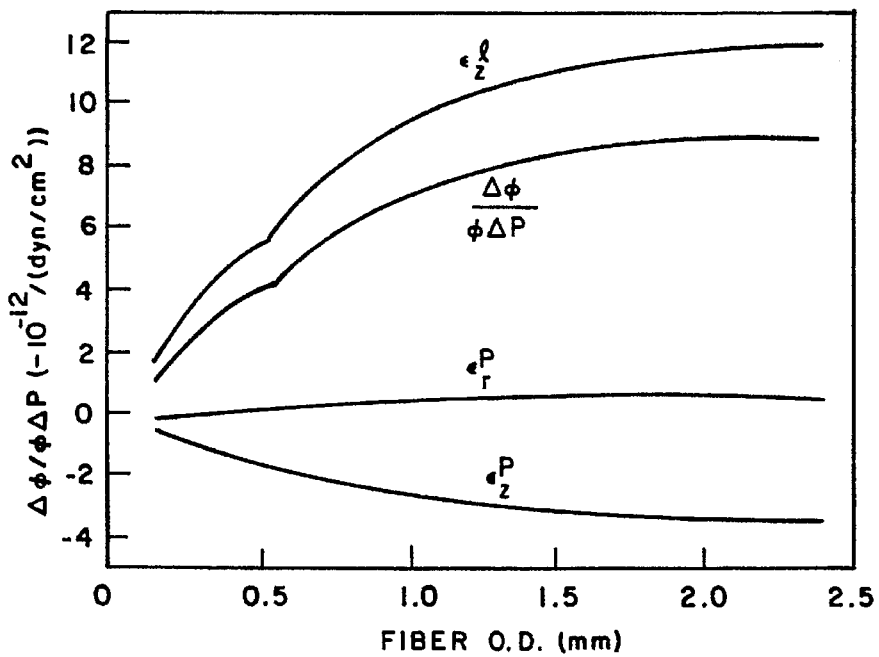
FIG. 8 (prior art) is a graph illustrating the pressure sensitivity of a fiber as illustrated by the approximation in FIG. 7.
Figure 9:
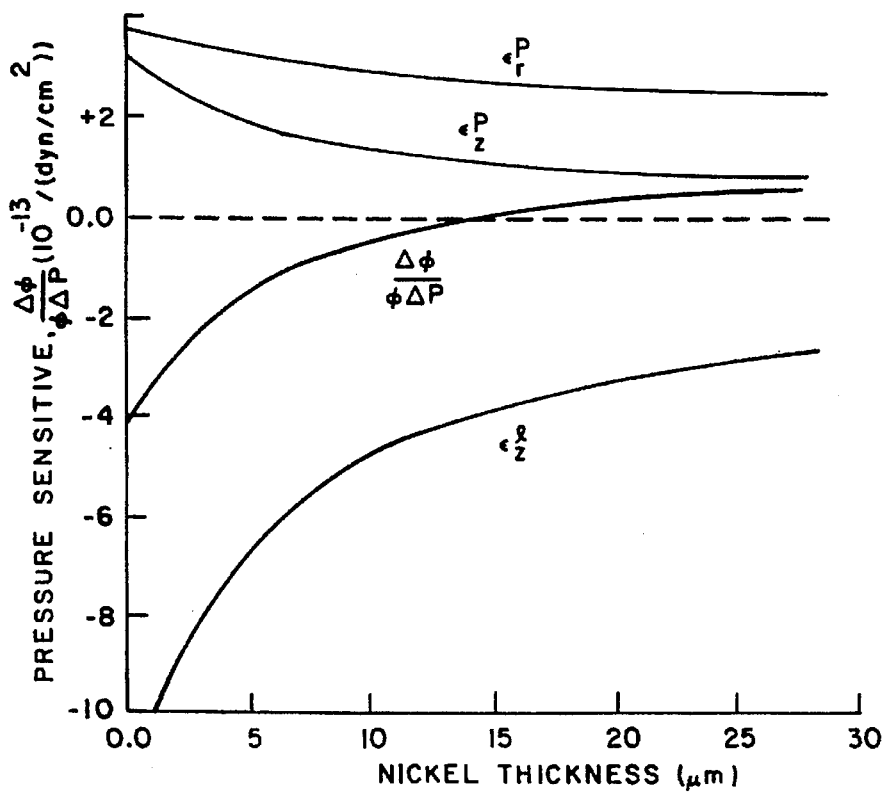
FIG. 9 (prior art) is a graph illustrating the calculated sensitivity of a fiber as a function of the thickness of a metal coating surrounding the fiber.

Analytically, the approximate model shown in FIG. 7 was used where the elastomeric layer 66 is approximated as an extra outer fiber coating. Moreover, center portion 68 included a core (such as core 69) surrounded by a cladding (such as cladding 71), where both the core and the cladding were made of glass. Table 1, below, lists all the parameters used in the calculations.

assumption that only the radial strain $\epsilon_r$ (see Equation 1) contributes, while the axial strains, $\epsilon_z$, are zero. A comparison of Equation 7 to Equations 8 and 9 shows that there is agreement between the experimental result and the sensitivity calculated with the axial strains being zero.

Acceleration Sensitivity of Planar Fiber Optic Sensors

TABLE 1

| | CENTER PORTION | | FIRST PROTECTING LAYER | STRESS PREVENTING LAYER | SECOND PROTECTING LAYER Stainless | ELASTOMERIC LAYER |
|---|---|---|---|---|---|---|
| | Glass Core | Glass Cladding | LAYER U.V. | Gel (Silicone) | Steel Tubing | Polyurethane (Uralite 3140) |
| Outer Diameter (Åm) | 8 | 125 | 250 | 640 | 840 | 25400 |
| Young's Modulus ($10^{10}$ dyn/cm$^2$) | 70.70 | 72.45 | 0.6 | 0.0035 | 196 | 0.014 |
| Poisson's Ratio | 0.165 | 0.17 | 0.474 | 0.49947 | 0.3 | 0.4988 |
| Ref. Index | 1.462 | | | | | |
| $P_{11}$ | 0.09 | | | | | |
| $P_{12}$ | 0.236 | | | | | |

In Table 1, the following approximations were made: the center portion 68 was a glass having a high numerical aperture (0.15); the first protecting layer 70 was an U.V. coating approximated as a hard U.V. elastomer; and the stress preventing layer 78 was taken as silicone. Assuming good bonding across all interfaces, the pressure sensitivity of the sensor 80 is shown in FIG. 15 as a function of the outer diameter of the fiber 64 illustrated in FIG. 12.

Figure 15:
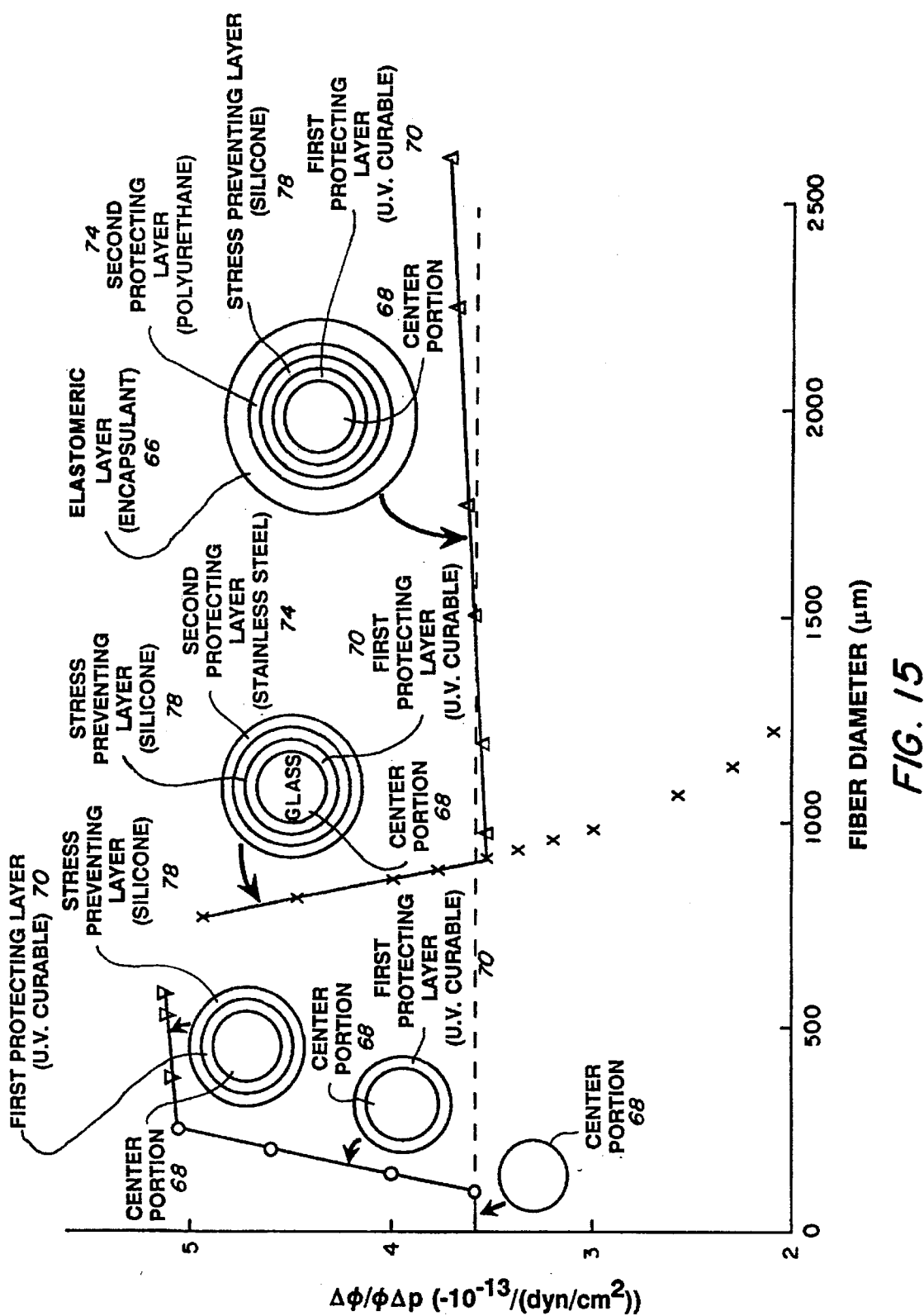
FIG. 15 is a graph illustrating the pressure sensitivity of a sensor using a fiber as illustrated in FIG. 12, as a function of the outer diameter of the fiber, according to an embodiment of the present invention.

As illustrated in FIG. 15, the center portion 68 (made of glass having a high Bulk Modulus) has a very low sensitivity. As the thickness of the first protecting layer 70 (the U.V. coating) increases, the sensitivity increases. The stress preventing layer 78 (the silicone gel) does not contribute much to the sensitivity since the stress preventing layer 78 is thin and has a very low Young's Modulus. As the thickness of the second protecting layer 74 (stainless steel tubing) increases, the sensitivity of the fiber decreases very rapidly due to the very high bulk and Young's Modulus of the second protecting layer 74. (In FIG. 15, the "X" symbols indicate the sensitivity that could have been obtained with a thicker metal as the second protecting layer 74.) Finally, the addition of polyurethane as an elastomeric layer 66 (for example, polyurethane, Uralite 3140 (trademark) as an encapsulant increases the sensitivity slowly, but steadily, as the thickness of the elastomeric layer 66 increases. For 1" thickness of the fiber, the pressure sensitivity was found from the following Equations 8 and 9.

Equation 8:

Analysis $$\frac{\Delta\phi}{\phi\Delta p} = 0.2 \times 10^{-11}/(dyn/cm^2) = -334 \text{ dB } re \text{ 1/}\mu\text{Pa}$$

Equation 9:

$$\frac{\Delta\phi}{\phi\Delta p}\bigg|_{\epsilon_z=0} = 0.13 \times 10^{-12}/(dyn/cm^2) = -358 \text{ dB } re \text{ 1/}\mu\text{Pa}$$

Equation 8 indicates the calculated sensitivity with all strains present, as is given by Equation 1 and shown in FIG. 15. Equation 9 indicates the sensitivity obtained with the As previously described for structural acoustic applications (see the Background of the Invention), an acoustic wave can be detected through acceleration induced strains instead of pressure induced strains. In this case, the analysis is as follows by referring to FIG. 16.

Figure 16:
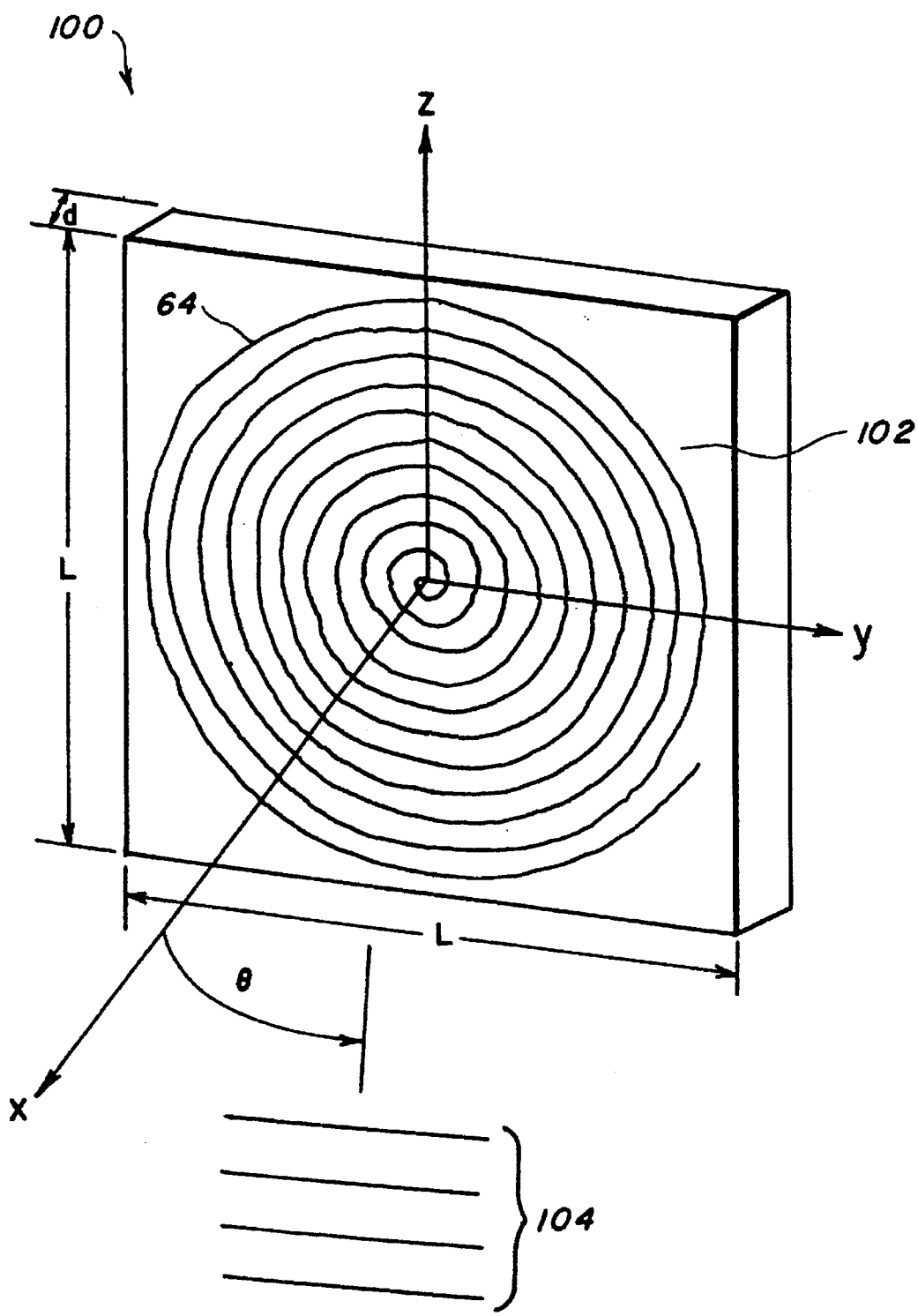
FIG. 16 is a diagram illustrating a planar fiber sensor, according to an embodiment of the present invention.

FIG. 16 is a diagram illustrating a planar sensor 100 formed by embedding a fiber 64 arranged in a spiral (as illustrated in FIGS. 10 and 12) within an elastomeric layer 102 (for example, polyurethane) of area $L^2$ and thickness d. The fiber long axis is kept in the yz plane. In estimating the response of the sensor 100 to a normally incident ($\theta=0$) acoustic wave 104, it is approximated that the strains generated in the elastomeric layer 102 are those which would exist without the embedded fiber in place, and that the important resulting fiber strains (i.e., those among the fiber axis) are those of the elastomeric layer 102. The response of the sensor 100 is then estimated to first order in the acoustic wavenumber $k_a$ by adding a term to the static response (which comes from the pressure response). The added term is proportional to the acoustic pressure gradient, which results to a uniaxial acceleration term. For an incident pressure P, the strain component lying in the yz plane due to the pressure gradient term is then determined from the following Equation 10.

Equation 10:

$$\epsilon_{yz} = -\nu \left|\frac{\partial P}{\partial \chi}\right| d/E,$$

where $\nu$ and E are the Poisson ratio and the Young's Modulus of the encapsulant forming the elastomeric layer 102, respectively. For a plane wave, Equation 10 gives the following Equation 11.

Equation 11:

$$e_{yz} = -\nu k_a d/E = -2\pi\nu fd/(cE),$$

where f and c are the fluid sound frequency and speed, respectively. It can be shown that, for a plane wave, acceleration a is related to pressure by the following Equation 12.

Equation 12:

$$\left|\frac{a}{p}\right| = \frac{2\pi f}{\rho c},$$

where $\rho$ is the fluid density. Thus, the following Equation 13 applies.

Equation 13:

$$\frac{\Delta\phi}{\phi p} = \frac{2\pi f}{\rho c}\left(\frac{\Delta\phi}{\phi a}\right)$$

In the above Equation 13, the pressure sensitivity is given by Equation 1 in terms of the axial $\epsilon_z$ and radial $\epsilon_r$ strains. If the small radial strain $\epsilon_r$ is ignored, Equations 1 and 11 provide the following Equation 14.

Equation 14:

$$\frac{\Delta\phi}{\phi P} = -\left(1 - \frac{n_2}{2}P_{12}\right)\frac{2\pi v f d}{cE}$$

From Equations 13 and 14, the following approximate expression for the acceleration sensitivity is obtained as Equation 15.

Equation 15:

$$\frac{\Delta\phi}{\phi a} = \rho\left(1 - \frac{n_2}{2}P_{12}\right)v\frac{d}{E_{eff}}$$

Here, $E_{eff}$ is the effective Young's Modulus of the sensor 100, which can be calculated using the approximation shown in FIG. 7 as the following Equation 16.

Equation 16:

$$E_{eff} = \frac{\Sigma E_i A_i}{A_{Tot}}$$

For a very thick sensor 100, $E_{eff}$ becomes the Young's Modulus of the encapsulant forming the elastomeric layer 102.

Experiments:

The acceleration sensitivity of the various fiber optic sensors was obtained by mounting them on a 6"×6"×1" honeycomb Al plate which was very light, but stiff, in order to avoid flexural excitations. The plate consisted of two 0.8 mm thick Al plates connected with thin Al hexagons. The sensor was held to the plate with double-sided tape. A reference accelerometer (Endevco 2250A (Trademark)) was also mounted under the Al plate, 1.5" away from the plate center. The plate was then vibrated in air by an electrically driven shaker (Bruel and Kjaer model 4806 (Trademark)). The results of the experiments are as follows.

Fiber 64 with a second protecting layer 74 made of stainless steel, a stress preventing layer 78 made of gel, and embedded in a polyurethane, elastomeric layer 66.

The tested fiber 64 had a main fiber 72 which comprised a center portion 68 made of glass and a first protecting layer 70 made of a U.V. curable material. The main fiber 72 was concentrically surrounded by a second protecting layer 74 made of stainless steel with a 840 μm o.d. and a 640 μm I.d. A stress preventing layer 78 was made of gel. The fiber 64 formed a planar coil (in a "pancake spiral" configuration) embedded in a 1" thick elastomeric layer 66 as an encapsulant. The elastomeric layer 66 was polyurethane. Thus, the sensor 62 was as illustrated in FIGS. 10, 11 and 12.

Figure 17:
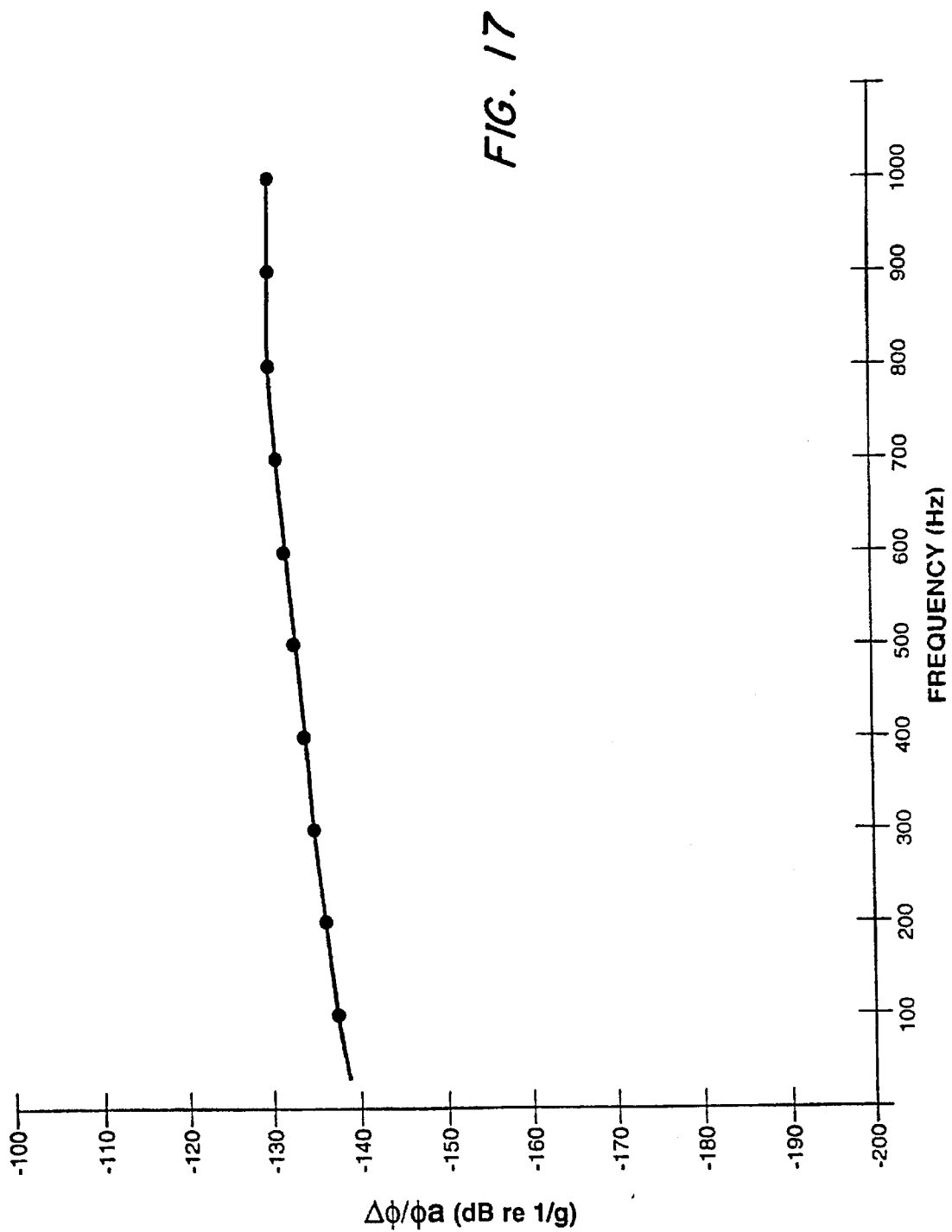
FIG. 17 is a graph illustrating the experimentally obtained acceleration sensitivity of a "pancaked spiral" sensor, according to an embodiment of the present invention.

The experimentally obtained acceleration sensitivity is shown in FIG. 17 and is represented by the following Equations 17 and 18.

Equation 17:

Experiment:

$$\frac{\Delta\phi}{\phi a} = -137 \text{ dB } re \text{ } 1/g$$

Equation 18:

Analysis:

$$\frac{\Delta\phi}{\phi a} = -121 \text{ dB } re \text{ } 1/g$$

As can be seen from FIG. 17, the acceleration sensitivity of the sensor 62 is high, down to very low frequencies, and is fairly flat over the frequency range of 0–1000 Hz. This sensor 62 with such a high acceleration sensitivity and a very low pressure sensitivity is an excellent accelerometer.

In the above equations, the analytically calculated sensitivity was obtained from Equations 15 and 16, while the experimental sensitivity is the low frequency limit (see FIG. 17). A comparison of Equations 17 and 18 indicates that the experimentally obtained sensitivity is lower by 16 dB than that obtained from Equations 15 and 16. This suggests that Equations 15 and 16 do not accurately represent the complicated structure of the fiber 64 with the frictionless interface of a gel as the stress preventing layer 78 and stainless steel as the second protecting layer 74. Such an interface was found to dramatically minimize pressure sensitivity, by not allowing the axial strains to communicate to the center portion 68. However, Equation 16 assumes that the axial strains communicate well from the encapsulant of the elastomeric layer 66 to the center portion 68 across all the interfaces involved. Therefore, a more sophisticated model is needed to explain the acceleration sensitivity of the fiber 64 with such a frictionless interface.

Fiber 64 with second protecting layer 74 made of stainless steel, a stress preventing layer 78 made of air (without gel), and embedded in a polyurethane, elastomeric layer 66.

Figure 18:
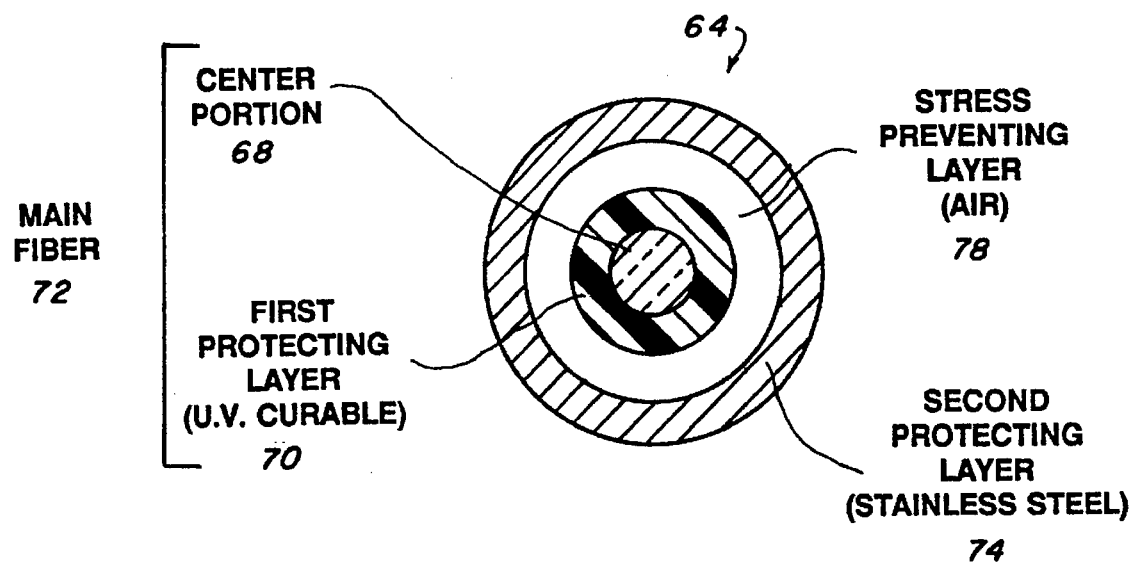
FIG. 18 is a diagram illustrating a fiber used in experimental testing, according to an embodiment of the present invention.
Figure 19:
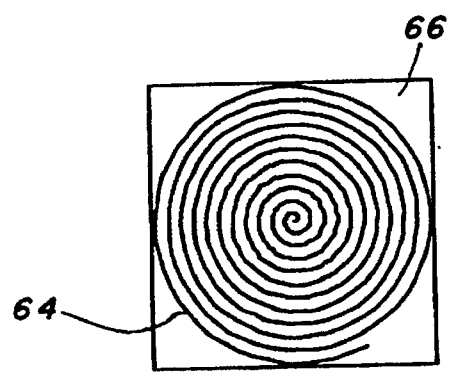
FIG. 19 is a diagram illustrating a "pancaked spiral" sensor using the fiber illustrated in FIG. 18, and used in experimental testing, according to an embodiment of the present invention.

FIG. 18 illustrates a fiber 64 which was tested in order to further investigate the role of gel as the stress preventing layer 78. As indicated in FIG. 18, a main fiber 72 included a center portion 68 made of glass and a first protecting layer 70 made of a U.V. curable material). The second protecting layer 74 made of stainless steel with a 840 μm o.d. and a 640 μm I.d. A stress preventing layer 78 was only air (without gel). That is, only air was between the main fiber 72 and the stainless steel second protecting layer 74. As illustrated in FIG. 19, the fiber 64 formed a planar coil (in a "pancaked spiral" configuration) embedded in a 6"×6"×1" elastomeric layer 66 made of polyurethane.

Figure 20:
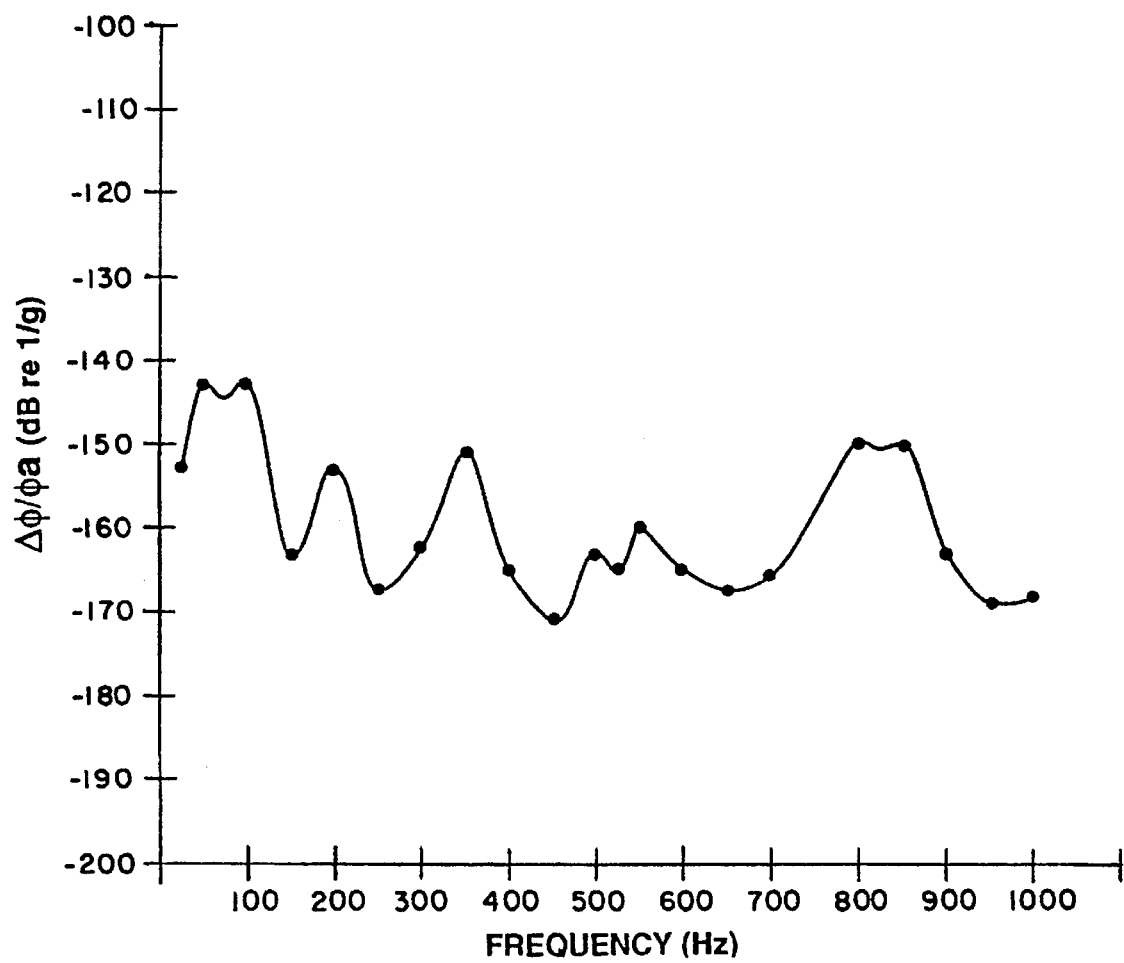
FIG. 20 is a graph illustrating experimental results of the acceleration response of the sensor illustrated in FIG. 19 using the fiber illustrated in FIG. 18, according to an embodiment of the present invention.

FIG. 20 is a graph illustrating experimental results of the acceleration response of the sensor illustrated in FIGS. 18 and 19, as a function of frequency. As can be seen from FIGS. 17 and 20, the acceleration response of a sensor with air (and without gel) as the stress preventing layer 78 is substantially lower than the acceleration response of a sensor with gel as the stress preventing layer 78. Without gel as the stress preventing layer 78, axial and radial strains in the second protecting layer 74 (stainless steel) are not easily transferred to the first protecting layer 70. Moreover, as can be seen from FIG. 20, the acceleration response of a fiber without gel as the stress preventing layer 78 has peaks, where these peaks indicate resonances. Such responses may result from bending effects of the fiber 64 which touch the inner surface of the second protecting layer 74 (the stainless steel tubing) at certain points.

Planar Sensors with Fiber Loops Perpendicular to The Large Face of the Sensor

Figure 21:
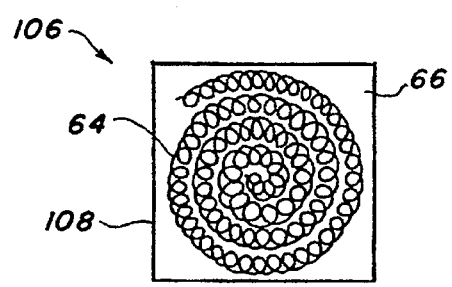
FIG. 21 is a diagram illustrating a sensor using the fiber illustrated in FIG. 12, and used in experimental testing, according to an embodiment of the present invention.

FIG. 21 is a diagram illustrating a sensor 106 which uses a fiber as illustrated in FIG. 12, but has minimum acceleration sensitivity and minimum acoustic sensitivity. The fiber 64 has fiber coils which are arranged in a spiral formed in a single plane. The fiber coils of the fiber 64 are perpendicular to the large face 108 of the sensor 106. Thus, the fiber 64 in FIG. 21 can be described as forming a plurality of sequential loops, where the plurality of sequential loops are arranged in the same plane as a spiral and are each perpendicular to the plane.

When an acoustic wave is incident perpendicular to the large face 108 of the sensor 106, the circular fiber loops will become elliptical. Therefore, no net fiber length change will occur to the first order. That is, the sensor 106 should have low acceleration sensitivity. In order to verify this low acceleration sensitivity, two sensors 106 were built and tested.

In the first tested sensor 106, the fiber 64 was 30 m long and included a main fiber 72 comprising a center portion 68 made of glass and a first protecting layer 70 made of a U.V. curable material. The second protective layer 74 was made of stainless steel having 840 μm o.d. and 640 μm i.d. The stress preventing layer 78 was made of a gel. The fiber 64 was embedded in a 6"×6"×1" polyurethane (Uralite 3140 (Trademark)) encapsulant as the elastomeric layer 66. The fiber loops of the fiber 64 had a ¾" diameter and were perpendicular to the large face 108 of the sensor 106 (as in FIG. 21).

Figure 22:
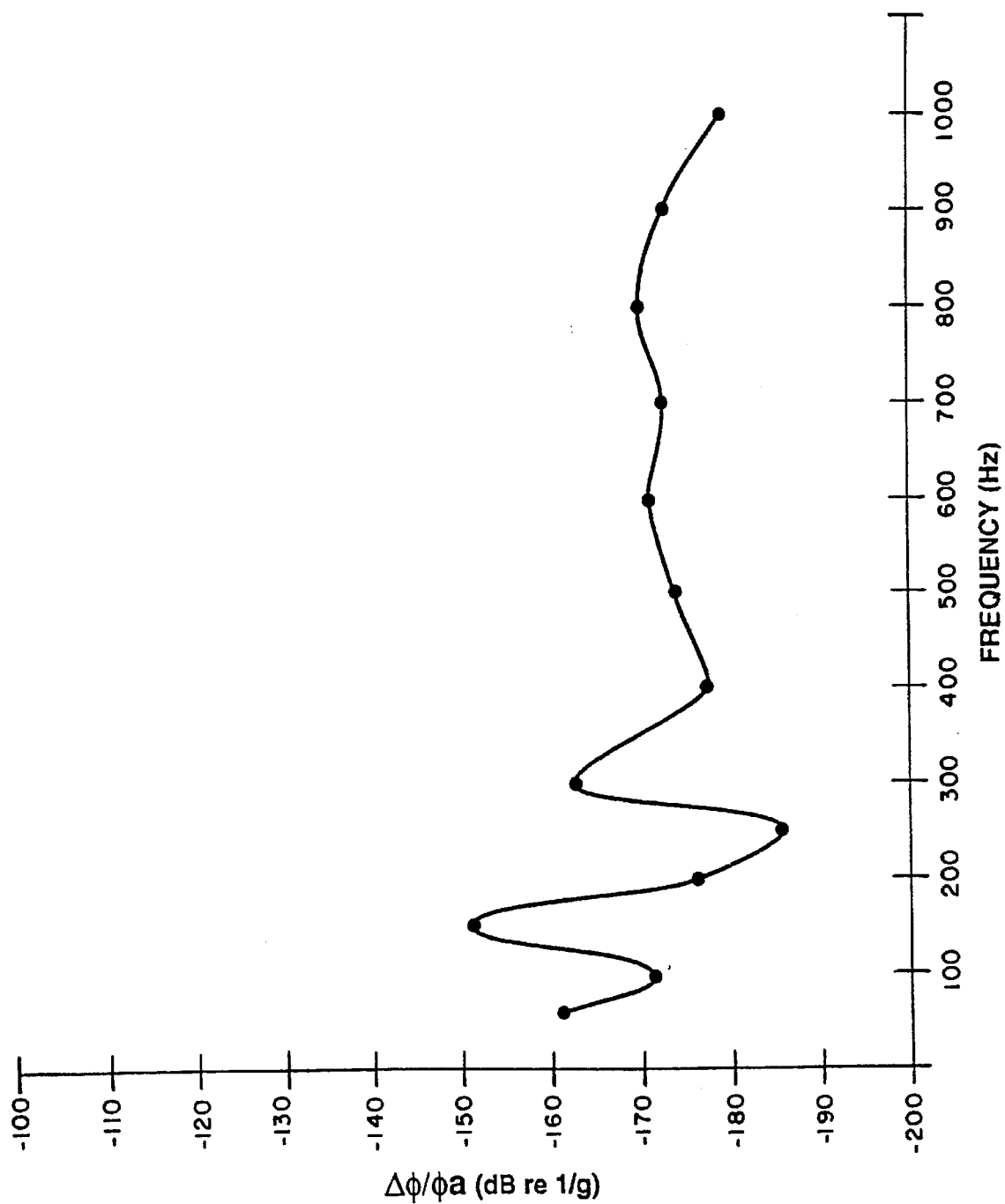
FIG. 22 is a graph illustrating experimental results of the acceleration sensitivity of the sensor illustrated in FIG. 21, according to an embodiment of the present invention.

FIG. 22 is a graph illustrating experimental results of the acceleration sensitivity of the sensor illustrated in FIG. 21, as a function of frequency. As can be seen by comparing FIGS. 20 and 22, the sensitivity of a sensor with loops perpendicular to the large face (as in FIG. 21) is much lower than a sensor having a "pancaked spiral" configuration (as in FIG. 19) where the fiber loops are in the plane of the large face.

Figure 24:
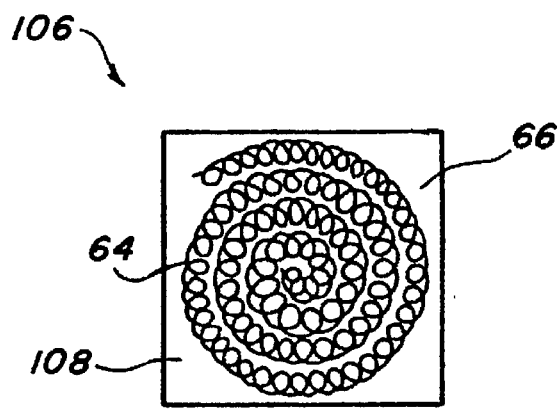
FIG. 24 is a diagram illustrating a sensor using the fiber illustrated in FIG. 23, and used in experimental testing, according to an embodiment of the present invention.
Figure 23:
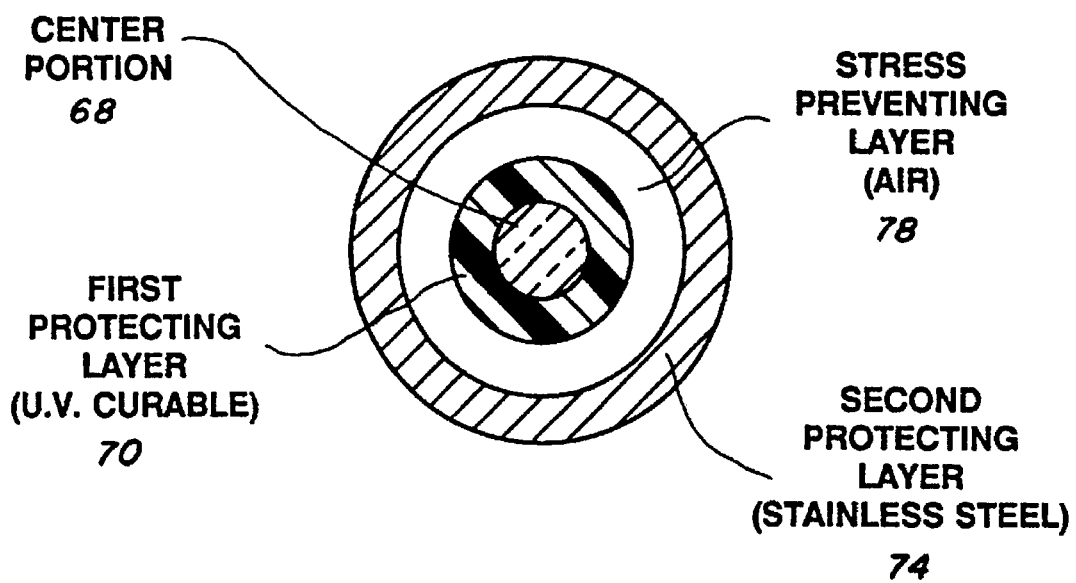
FIG. 23 is a diagram illustrating a fiber used in experimental testing, according to an embodiment of the present invention.

FIGS. 23 and 24 are diagrams illustrating the second tested sensor 106. The sensor 106 illustrated in FIGS. 23 and 24 was identical to the sensor illustrated in FIG. 21, except the fiber had a stress preventing layer 78 made of air (as compared to the sensor 106 illustrated in FIG. 21, which had a stress preventing layer 78 made of a gel).

Figure 25:
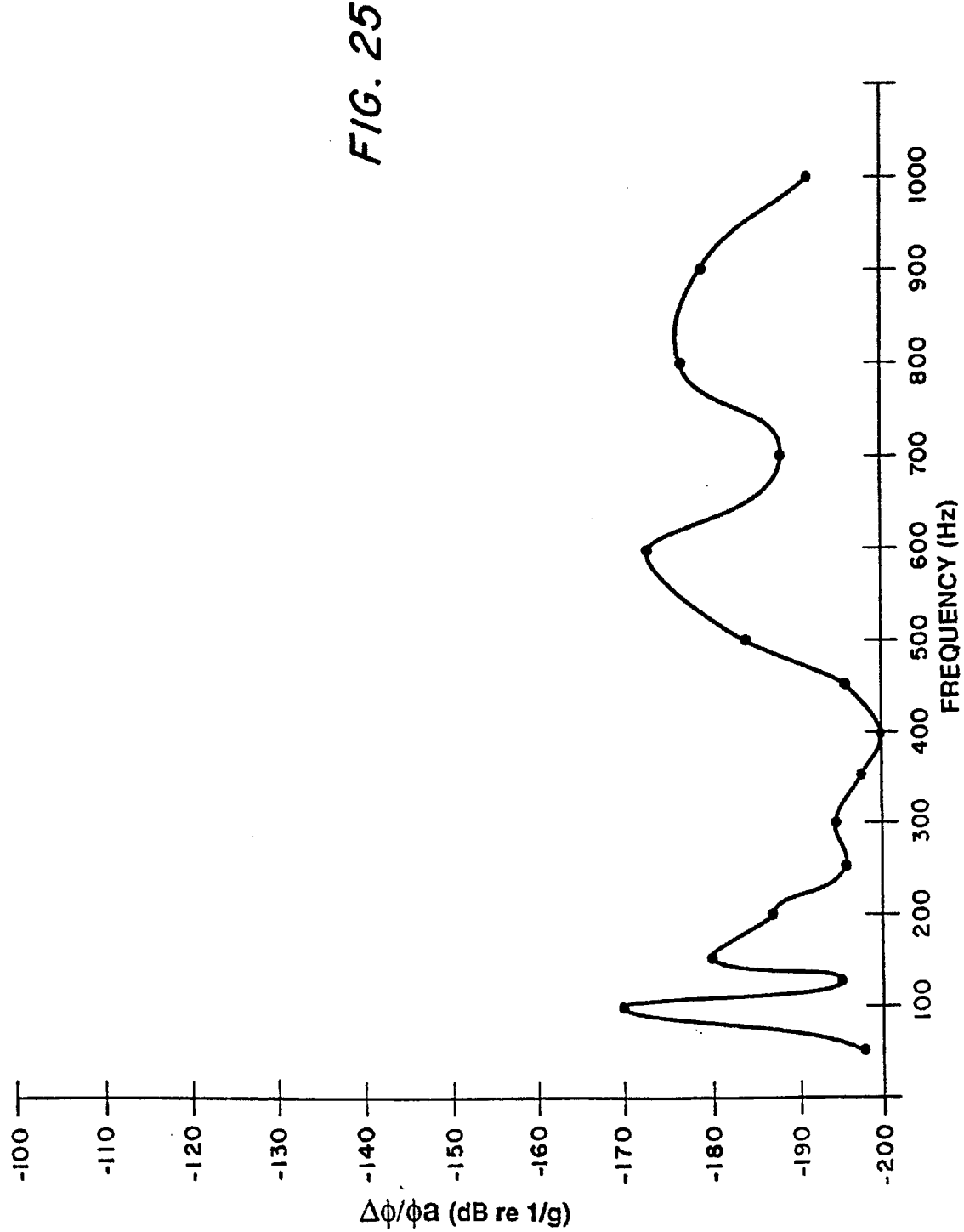
FIG. 25 is a graph illustrating experimental results of the acceleration sensitivity of the sensor illustrated in FIGS. 24 using the fiber illustrated in FIG. 23, according to an embodiment of the present invention.

FIG. 25 is a graph illustrating experimental results of the acceleration sensitivity of the sensor 106 illustrated in FIGS. 23 and 24, as a function of frequency. As can be seen by comparing FIGS. 20 and 25, the acceleration sensitivity of a sensor with fiber loops perpendicular to the large face is significantly lower to the acceleration sensitivity of a sensor having the fiber loops in the plane of the large face (in both sensors, the fiber was the same). Also, as can be seen by comparing FIGS. 22 and 25, the sensitivity of a sensor having fiber loops perpendicular to the large face of the sensor, is lower when the fiber has gel as the stress preventing layer as compared to when the fiber has air as the stress preventing layer. This result is similar to results obtained by comparing FIGS. 17 and 20 for a sensor having a fiber arranged in a "pancaked spiral" configuration.

A sensor with fiber loops perpendicular to the large face of the sensor is useful in sensing applications where low pressure sensitivity and low acceleration sensitivity are required. For example, such a sensor can be used as the reference arm of an interferometric sensor (see reference arm in FIG. 2), as leads to an interferometric sensor (see input lead and output lead in FIG. 2), and as the sensing arm in magnetic or electric sensors. In a magnetic or electric sensor, a glass core of the fiber should be coated with a magnetostrictive material for magnetic sensing, and with an electrostrictive material for electric sensing.

While a sensor configuration as illustrated, for example, in FIGS. 10 and 11 has only one embedded coil, various sensor configurations can easily be designed which have two or more embedded coils. The use of more than one coil allows for the total length of fiber to be increased. This is advantageous since the intensity of a signal produced by a sensor is directly proportional to the length of fiber used in the sensor. Therefore, the use of more than one coil increases the length of fiber, thereby increasing the signal produced by the sensor. Moreover, the resonant frequency of the sensor is expected to increase with more fiber coils. Therefore, the resonant frequency and sensitivity of a sensor can be controlled by using an appropriate length of fiber in the sensor.

Figure 26:
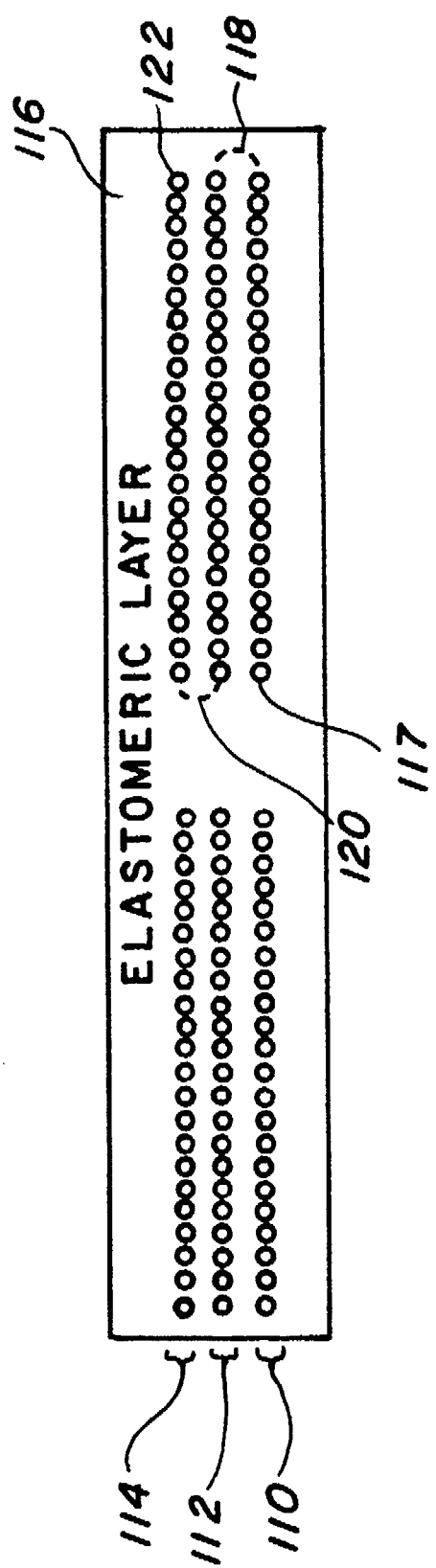
FIG. 26 is a diagram illustrating a cross-section along lines XI—XI in FIG. 10 of such a sensor having three (3) coils, according to an embodiment of the present invention.

For example, to extend the length of fiber used in a sensor, a sensor as illustrated in FIG. 10 could have three (3) coils in parallel to each other, one above the other. FIG. 26 is a diagram illustrating a cross-section along lines XI—XI in FIG. 10 of such a sensor having three (3) coils. As illustrated in FIG. 26, a first coil 110, a second coil 112 and a third coil 114 are embedded in an elastomeric layer 116. Preferably, the first coil 110, the second coil 112 and the third coil 114 are formed from the same fiber. Thus, for example, one end of the fiber begins at the inner diameter 117 of the first coil 110, and is spiraled to form the first coil 110. Dotted line 118 shows that, after the first coil 110 is formed, the fiber forms the second coil 112 starting at the outer diameter of the second coil 112. After the second coil 112 is formed by spiraling the fiber from the outer diameter to the inner diameter of the second coil 112, dotted line 120 shows how the fiber forms the third coil 114 by starting at the inner diameter of the third coil 120. Thus, the fiber extends from the inner diameter 117 of the first coil 110 to the outer diameter 122 of the third coil 122. However, the exact starting and ending points of a fiber as used to form the various coils can be easily changed and configured as desired by a person skilled in the art. For example, it is not necessary for the fiber to begin at the inner diameter of the first coil 110 and, instead, the fiber can begin at the outside diameter of the first coil 110. Moreover, it is not necessary for three (3) coils to be used. Instead, one, two or any number of coils can be embedded in the elastomeric layer 116, depending on the specific application and design choices.

Further, the first coil 110, the second coil 112 and the third coil 114 can each be a "pancaked spiral configuration" (as illustrated, for example, in FIGS. 10 and 11) or a spiral formed as a plurality of sequential loops which are each perpendicular to the large face of the sensor (as illustrated, for example, in FIG. 21).

Figure 28:
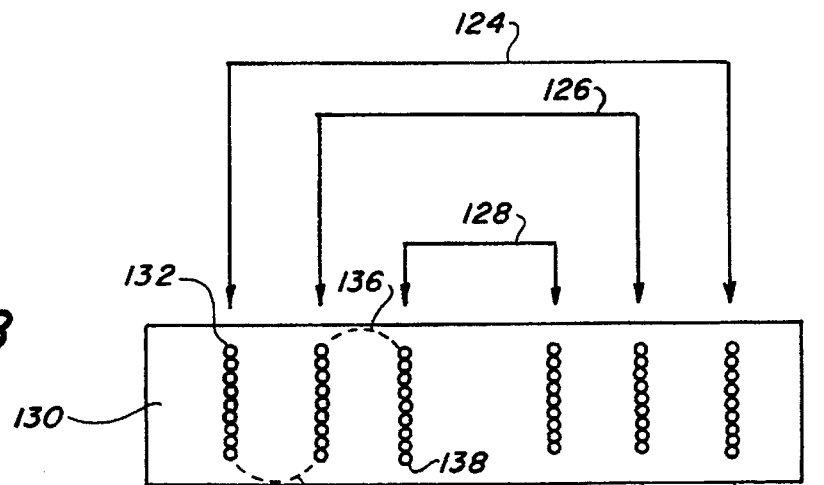
FIG. 28 is a diagram illustrating a cross-section along lines XXVIII in FIG. 27, according to an embodiment of the present invention.
Figure 27:
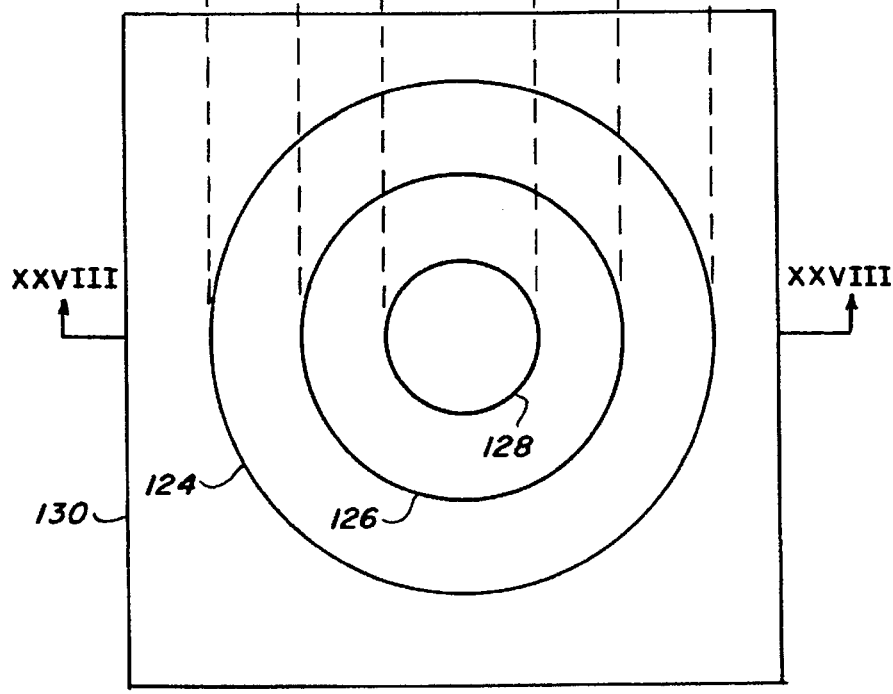
FIGS. 27 is a diagram of a sensor having three cylindrical-shaped coils, where each cylindrical-shaped coil has a different radius, according to an embodiment of the present invention.

FIGS. 27 and 28 illustrate a sensor having three concentrically arranged cylindrical-shaped coils, where each cylindrical-shaped coil has a different radius. More specifically, FIG. 28 is a cross-section along lines XXVIII in FIG. 27. As illustrated in FIGS. 27 and 28, the sensor includes a first coil 124, a second coil 126 and a third coil 128 embedded in an elastomeric layer 130. Each of the first coil 124, the second coil 126 and third coil 128 is cylindrical-shaped with a different radius than the other coils. Preferably, the first coil 124, the second coil 126 and the third coil 128 are formed from the same fiber. Thus, for example, one end of the fiber begins at the top 132 of the first coil 124, and is spiraled in a cylindrical shape to form the first coil 124. Dotted line 134 shows that, after the first coil 124 is formed, the fiber forms the second coil 126 by starting at the bottom of the second coil 126. After the second coil 126 is formed by spiraling the fiber from the bottom to the top of the second coil 126, dotted line 136 shows how the fiber forms the third coil 128 by starting at the top of the third coil 128. Thus, the fiber extends from the top 132 of the first coil 124 to the bottom 138 of the third coil 128. However, the exact starting and ending points of a fiber as used to form the various coils can be easily changed and configured as desired by a person skilled in the art.

Figure 29:
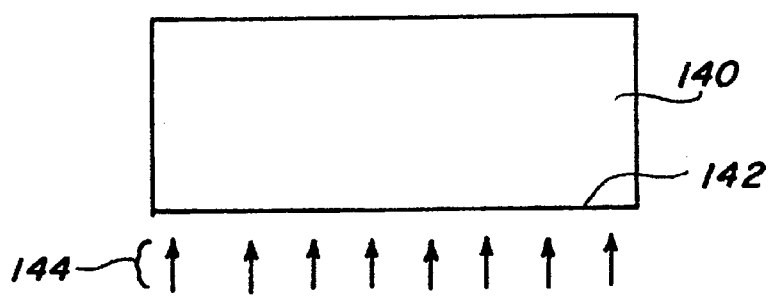
FIG. 29 is a diagram illustrating out of plane normal motion affecting a sensor.
Figure 30:
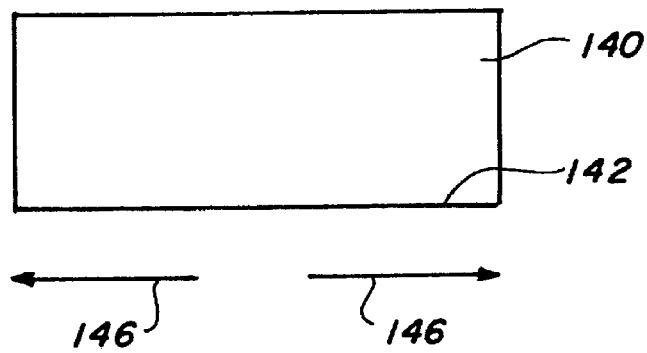
FIG. 30 is a diagram illustrating in plane stretching motion affecting a sensor.
Figure 31:
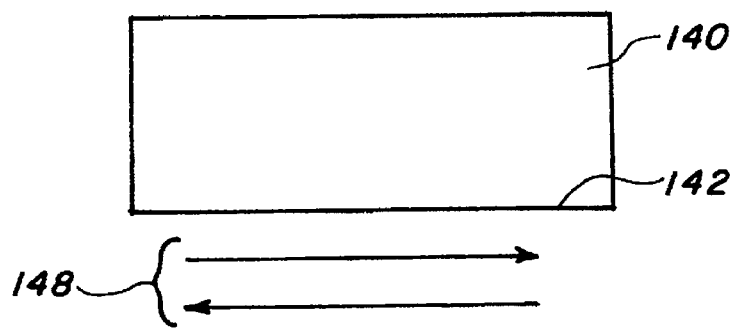
FIG. 31 is a diagram illustrating in plane side-to-side motion affecting a sensor.

FIGS. 29, 30 and 31 illustrate, respectively, normal motion, stretching motion and side-to-side motion affecting a sensor. As illustrated in FIG. 29, the sensor 140 has a large face 142, and normal motion 144 is perpendicular to the large face 142 of the sensor 140. As illustrated in FIG. 30, stretching motion 146 stretches the large face 142 of the sensor 140. As illustrated in FIG. 31, side-to-side motion 148 pushes the entire sensor 140 in a side-to-side manner. A sensor is preferably uniaxial. That is, for optimum performance, the sensor should respond only to normal motion which is perpendicular to the large face of the sensor. Thus, stretching motion and side-to-side motion affecting the sensor should be reduced. For example, stretching of a hull of a submarine will cause an undesirable stretching of a sensor attached thereto, and efforts should be made to reduce the stretching of the sensor.

Figure 32:
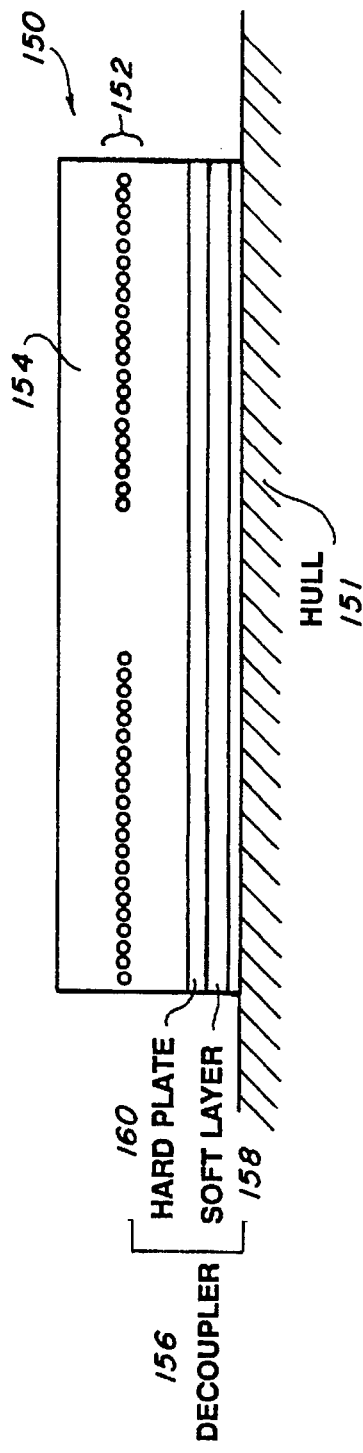
FIG. 32 is a diagram illustrating a decoupler for attaching a sensor to a structure and for reducing the stretching motion affecting the sensor, according to an embodiment of the present invention.

FIG. 32 illustrates a decoupler for attaching a sensor to a structure, such as a hull of a ship or submarine, for reducing the stretching motion affecting the large face of the sensor caused by stretching of the structure. As illustrated in FIG. 32, a sensor 150 is attached to, for example, a hull 151 of a submarine (not illustrated). Although FIG. 32 shows a hull, the sensor can be attached to virtually any structure, such as a building, a bridge or a ship. The sensor 150 can have any of the configurations, discussed herein, but is illustrated in FIG. 32 as comprising a fiber 152 arranged as a single coil and embedded in an elastomeric layer 154. The sensor 150 is attached to the hull 151 by a decoupler 156 formed by a soft layer 158 and a hard plate 160. The soft layer 158 is attached to the hull 151, the hard plate 160 is connected to the soft layer 158, and the sensor is mounted on the hard plate 160. The decoupler 156 reduces the stretching motion affecting the sensor 150 because, when the hull 151 stretches, the soft layer 158 deforms without introducing much stress to the hard plate 160. Since the hard plate 160 is generally a stiff material which does not stretch easily, the remaining stress passing to the hard plate via the soft layer 158 will not stretch much at all the hard plate 160. As a result, the sensor 150, mounted on the hard plate 160, will not be stretched.

The soft layer 158 is preferably an elastomeric material. Generally, the soft layer 158 should have a Young's Modulus less than or equal to $1 \times 10^{10}$ dyn/cm$^2$, wherein the lowest possible Young's Modulus is preferred. Preferably, the soft layer 158 is made of polyurethane, which has a Young's Modulus of approximately $0.014 \times 10^{10}$ dyn/cm$^2$. More preferably, the soft layer 158 is made of a silicone having a Young's Modulus of approximately $0.0035 \times 10^{10}$ dyn/cm$^2$ or a rubber. The thickness of the soft layer 158 is preferably 0.010" to 0.100". More preferable is for the thickness of the soft layer 158 to be greater than 0.100".

The hard plate 160 should have a Young's Modulus greater than or equal to $1 \times 10^{10}$ dyn/cm$^2$, wherein the highest possible Young's Modulus is preferred. Preferably, the hard plate 160 has a Young's Modulus greater than or equal to $5 \times 10^{10}$ dyn/cm$^2$. Even more preferably, the hard plate 160 has a Young's Modulus greater than or equal to $70 \times 10^{10}$ dyn/cm$^2$. Nickel, having a Young's Modulus of approximately $200 \times 10^{10}$ dyn/cm$^2$, would be an excellent material for the hard plate 160. The thickness of the hard plate 160 is preferably 0.001" to 0.010". More preferable is for the thickness of the hard layer 160 to be greater than 0.010".

A decoupler as in FIG. 32 can dramatically reduce the stretching motion affecting a sensor by 20 dB, 30 dB, or more.

Figure 33:
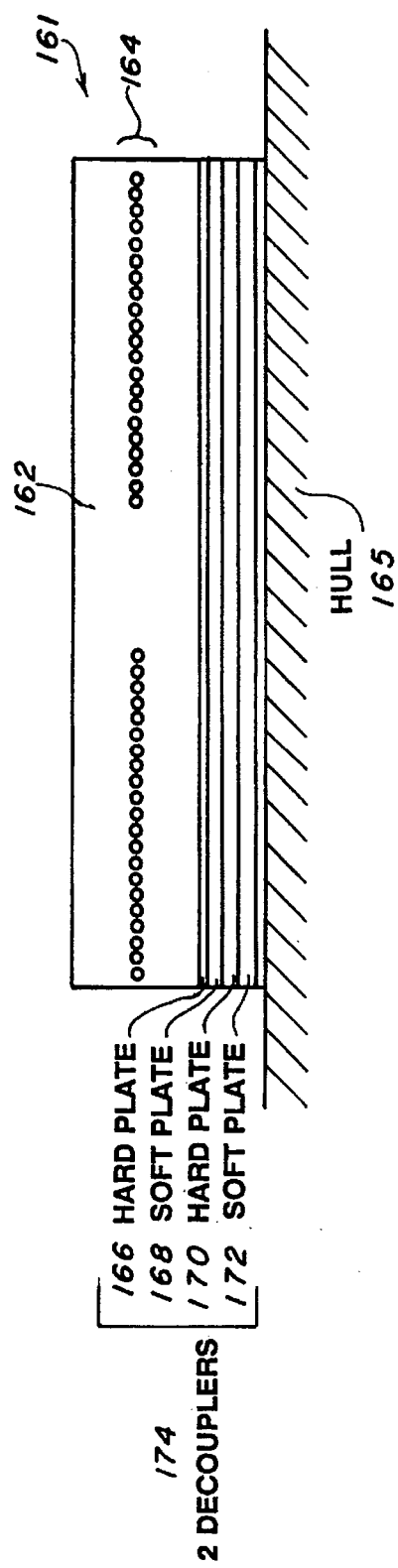
FIG. 33 is a diagram illustrating two decouplers for attaching a sensor to a structure and for reducing the stretching motion affecting the sensor, according to an embodiment of the present invention.

FIG. 33 illustrates two decouplers 174, one decoupler (166, 168) disposed on top of the other (170, 172), for attaching a sensor to a structure, as was discussed above for the one decoupler case shown in FIG. 32. The sensor 161 can have any of the configurations discussed before, but is shown in FIG. 33 as comprising a fiber 164 arranged as a single coil and embedded in an elastomeric layer 162. The sensor 161 is attached to the hull 165 by a system of two decouplers 174 formed by soft layers 168 and 172 interleaved with hard layers 166 and 170. All of the physical and geometrical parameters of these layers of the two decouplers 174 are similar to those discussed above for the single decoupler case shown in FIG. 32.

The two decouplers 174 of FIG. 33 can dramatically reduce the stretching motion affecting the sensor by 40 dB, 50 dB or even more. For even more reduction, a series or plurality of decouplers, each similar in construction and operation to the decoupler 156 shown in FIG. 32, can be used in order to obtain the desired decoupling of the stretching motion.

Fiber optic sensors according to the above embodiments of the present invention offer significant advantages over conventional sensors using PZTs. For example, contrary to sensors using PZTs, the fiber output signal is light and not electrical. Therefore, fiber optic sensors can be totally dielectric at the wet end and, therefore, are immune to electromagnetic interference. Moreover, fiber optic sensors can be controlled remotely. That is, the electronics (for example, a light source and a detector) can be located far away from the sensing location.

Moreover, fiber optic sensors according to the above embodiments of the present invention can provide high sensitivity and very small minimum detectable acceleration. Fiber optic sensors can be designed to maximize acceleration sensitivity while minimizing pressure sensitivity. For acceleration integration, fiber optic sensors can be formed in any shape and can cover large areas. By contrast, many PZTs must be connected together to cover large areas. Further, fiber optic sensors can have density and acoustic impedance very similar to that of water. This is desirable for underwater applications to minimize weight and sound scattering. By contrast, PZTs are heavy and have an acoustic impedance different from that of water.

In addition, the "wet" end of the fiber sensor can be inexpensive since the electronics (for example, a light source and a detection system) can be far away in a safe location. Moreover, contrary to PZTs, a fiber optic sensor can operate in hostile environments. For example, a fiber optic sensor can operate in high electric fields, chemically corrosive places, and explosive environments. Fiber optic sensors can also provide security of operation which cannot be offered by PZTs.

According to the above embodiments of the present invention, fiber geometry, fiber materials, sensor design, sensor shape, and the use of encapsulant can be changed to optimize specific sensing applications. Also, high acceleration sensitivity can be achieved by wrapping an optical fiber in a spiral configuration with the coils in the large face of the sensor and then embedding the spirally configured coil in an elastomer, such as polyurethane.

Pressure sensitivity increases the noise of a sensor and must be minimized. Therefore, according to the above embodiments of the present invention, pressure sensitivity is minimized by not allowing any axial strains to be transferred from the encapsulant to the core of the fiber. This is accomplished by using an interface which does not transfer axial strains to the core. Such an interface can be a highly compliant layer, such as gel, and is similar to a fluid being confined in a layer (such as a tubing) surrounding the fiber. Such a compliant layer prevents any axial strains from being transferred to the core, thereby significantly minimizing pressure sensitivity. With such a compliant layer, only radial strain is transferred effectively to the glass. This strain can be minimized by having a protective layer (such as a tubing) with a high Young's Modulus. For example, the protective layer is preferably stainless steel. Further pressure desensitization, which can be total, can be achieved by making the fiber inside the tubing pressure insensitive.

According to the above embodiments of the present invention, fiber loops perpendicular to the large face of a sensor can minimize acceleration sensitivity. If this fiber has a protective layer (such as a tubing coating) with a compliant filler (such as gel) between the core and the protective layer, the fiber will have minimum acceleration sensitivity and minimum pressure sensitivity. Such a fiber can be used as reference and lead fibers in an interferometric accelerometer which requires the reference and the lead fibers to have minimum acceleration sensitivity.

Moreover, according to the above embodiments of the present invention, the second protective layer of a fiber (that is, an outer tubing) can be made of a stiff material, such as stainless steel, thereby providing dramatic acceleration and pressure desensitization. Such a design can be used for detecting non-mechanical fields, such as electric and magnetic.

The above embodiments of the present invention generally relate to fiber optic sensors which detect acceleration ("accelerometers"). However, the present invention is not intended to be limited to accelerometers, and can be used in many different types of sensors and in many different types of application. Moreover, the optical fiber described herein is not intended to be limited for use in sensors, and can be used in many other fiber optical applications.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A sensor comprising:
    an encapsulant; and
    a fiber embedded in said encapsulant, said fiber including:
        a light transmitting center portion,
        a protecting layer, concentrically surrounding said center portion, for reducing the effect of environmental factors on said center portion, and
        a stress preventing layer, concentrically surrounding said center portion, positioned between said protecting layer and said center portion, and having a Young's Modulus substantially lower than the Young's Modulus of said protecting layer, for preventing stress from being transferred from said protecting layer to said center portion,
    wherein said embedded fiber is arranged in a pancaked spiral configuration in the encapsulant.

2. The sensor of claim 1 wherein:
    said stress preventing layer of said fiber has a Young's Modulus less than or equal to $0.004 \times 10^{10}$ dyn/cm$^2$.

3. The sensor of claim 2 wherein:
    said protecting layer of said fiber has a Young's Modulus higher than the Young's Modulus of said center portion of said fiber.

4. The sensor of claim 1 wherein:
    said embedded fiber is arranged to form at least two pancaked spiral configurations in parallel with each other and stacked one above the other.

5. A sensor comprising:
    an encapsulant; and
    a fiber embedded in said encapsulant, said fiber comprising
        a light transmitting center portion,
        a protecting layer, concentrically surrounding said center portion, for reducing the effect of environmental factors on said center portion, and
        a stress preventing layer, concentrically surrounding said center portion, positioned between said protecting layer and said center portion, and having a Young's Modulus substantially lower than the Young's Modulus of said protecting layer, for preventing stress from being transferred from said protecting layer to said center portion,
    wherein said embedded fiber forms a plurality of sequential loops, arranged in the same plane, as a spiral, said plurality of sequential loops each being perpendicular to the plane.

6. The sensor of claim 5 wherein:
    said stress preventing layer of said fiber has a Young's Modulus less than or equal to $0.004 \times 10^{10}$ dyn/cm$^2$.

7. The sensor of claim 6 wherein:
    said protecting layer of said fiber has a Young's Modulus higher than the Young's Modulus of said center portion of said fiber.

8. The sensor of claim 5 wherein:
    said embedded fiber is arranged to form at least two spirals in parallel with each other and stacked one above the other.

9. A sensor comprising:
    an encapsulant; and
    a fiber embedded in said encapsulant, said fiber comprising
        a light transmitting center portion,
        a protecting layer, concentrically surrounding said center portion, for reducing the effect of environmental factors on said center portion, and
        a stress preventing layer, concentrically surrounding said center portion, positioned between said protecting layer and said center portion, and having a Young's Modulus substantially lower than the Young's Modulus of said protecting layer, for preventing stress from being transferred from said protecting layer to said center portion,
    wherein said embedded fiber is arranged as a cylindrical-shaped coil in said encapsulant.

10. The sensor of claim 9 wherein:
    said embedded fiber is arranged as at least two cylindrical-shaped coils in the encapsulant, said at least two cylindrical-shaped coils being concentrically arranged, with each of said at least two cylindrical-shaped coils having a different radius than the other of said at least two cylindrical-shaped coils.

11. A decoupler for attaching a fiber optic sensor to a structure, comprising:

a first layer made of a material having a Young's Modulus less than or equal to $1 \times 10^{10}$ dyn/cm$^2$, said first layer having a first side and a second side, said first side being adjacent to said structure; and a second layer made of a material having a Young's Modulus greater than $1 \times 10^{10}$ dyn/cm$^2$, said second layer having a first side and a second side, said first side of said second layer being adjacent to said second side of said first layer, and said second side of said second layer being connected to said fiber optic sensor.

12. The decoupler of claim 11 wherein:

said first layer is made of polyurethane having a Young's Modulus of approximately $0.014 \times 10^{10}$ dyn/cm$^2$.

13. The decoupler of claim 11 wherein:

said first layer is made of a rubber having a Young's Modulus of approximately $0.0035 \times 10^{10}$ dyn/cm$^2$.

14. The decoupler of claim 11 wherein:

said second layer is made of a material having a Young's Modulus greater than $5 \times 10^{10}$ dyn/cm$^2$.

15. The decoupler of claim 12 wherein:

said second layer is made of a material having a Young's Modulus greater than $5 \times 10^{10}$ dyn/cm$^2$.

16. The decoupler of claim 13 wherein:

said second layer is made of a material having a Young's Modulus greater than $5 \times 10^{10}$ dyn/cm$^2$.

17. The decoupler of claim 11 wherein:

said second layer is made of a material having a Young's Modulus greater than $70 \times 10^{10}$ dyn/cm$^2$.

18. The decoupler of claim 12 wherein:

said second layer is made of a material having a Young's Modulus greater than $70 \times 10^{10}$ dyn/cm$^2$.

* * * * *